355-463
OR 3,997,247
SR

United States

[11] 3,997,247

Glatzel et al.

[45] Dec. 14, 1976

[54] UNSYMMETRICAL WIDE ANGLE LENS

[75] Inventors: Erhard Glatzel, Heidenheim; Heinz Zajadatz, Essingen, both of Germany

[73] Assignee: Carl Zeiss-Stiftung, Oberkochen, Germany

[22] Filed: Mar. 18, 1975

[21] Appl. No.: 559,585

[30] Foreign Application Priority Data

Mar. 18, 1974 Germany .......................... 2412898

[52] U.S. Cl. .............................................. 350/214
[51] Int. Cl.² ...................................... G02B 9/00
[58] Field of Search ................................. 350/214

[56] References Cited
UNITED STATES PATENTS

3,833,290  9/1974  Glatzel et al. ................ 350/214

Primary Examiner—Ronald J. Stern
Assistant Examiner—Conrad Clark
Attorney, Agent, or Firm—Stonebraker, Shepard & Stephens

[57] ABSTRACT

A wide angle lens of moderate aperture, similar in general to the lens of Glatzel et al. U.S. Pat. No. 3,833,290, but differing from it and from other similar lenses in the refractive power distribution as between two dispersing components near the front of the lens, and the refractive power distribution as between two air lenses, one formed between the two dispersive components just mentioned and the other formed between the second dispersing component and a next following condensing component. By designing the lens to have the power distribution at these points between certain stated limits, greatly increased performance is achieved, with reduction of specific aberrations of higher order, and with sharpness of distant real points brought extremely close to the ideal Rayleigh limit.

18 Claims, 6 Drawing Figures

UNSYMMETRICAL WIDE ANGLE LENS

CROSS REFERENCE TO RELATED APPLICATION

The present invention may be regarded as an improvement upon the lens disclosed in application Ser. No. 309,645, filed Nov. 27, 1972 in the names of the two present inventors and a third joint inventor, which application has become U.S. Pat. No. 3,833,290, granted Sept. 3, 1974.

BACKGROUND OF THE INVENTION

The present invention relates to lenses for use in photography and related fields, particularly lenses of the type known as unsymmetrical or asymmetrical wide angle lenses. Many forms of such lenses are known in the art. The present invention deals particularly with improvements in lenses of the general type or configuration disclosed in the above mentioned U.S. Pat. No. 3,833,290 for an invention of the present applicants and another person. The entire disclosure of said U.S. Pat. No. 3,833,290 is incorporated herein by reference.

The various embodiments of the lens of the present invention have a number of characteristics in common with the lens of said patent. Among the characteristics common to the patent and to the present invention are the following:

1. The lens has at least five components air separated from each other and containing a total of at least eight separate lens elements. These components may also be referred to as members or groups, it being understood that the word "group" does not necessarily imply a combination of two or more lens elements, since some of the groups (if one chooses to call them groups) consist of only a single lens element. In the present specification they will be referred to usually as components, some of the components consisting of only a single lens element and some consisting of two or more lens elements closely associated with each other, possibly but not necessarily cemented to each other.

2. The above mentioned components comprise two components each of which, as a whole, has a condensing or converging action, these two components being separated from each other by a central vertex space in which a diaphragm of adjustable aperture may be placed, if desired. These two condensing components are identified, both in the patent and in the present application, as components C and D.

3. In front of these components C and D there are two meniscus components identified in the patent and in the present application as components A and B, both of which have front surfaces which are convex toward the front or longer conjugate or object side of the lens. These two components A and B have, in combination with each other, a dispersing or negative action.

4. The combined inherent refractive power $\Phi_{AB}$ of these two components A and B together has a negative value in the range from 1.19 to 0.24 times the equivalent refractive power of the entire lens system $\Phi$. The combined refractive power $\Phi_{AB}$ of these two components is the reciprocal of their combined focal length $f_{AB}$.

5. Either of these front components A and B may consist of a single lens element, or may be split into two lens elements. Both in said patent and in the present application, there are specific examples of lenses having split components and lenses having single element components in this location.

6. Behind the above mentioned central condensing components C and D, there is a negative component identified as component E both in the patent and in the present application, which component E has a rear surface which is convex toward the rear or image side of the lens.

7. The rear surfaces of the front meniscus components A and B are concave toward the rear, and the front surface of the rear negative component E is concave toward the front. Stated another way, the components A, B, and E all have concave surfaces toward the central vertex space, that is, the space between the components C and D, this space being identified as CS both in the patent and in the present application.

8. The front condensing component C is made up of at least two individual lens elements.

9. In this component C, the rear lens element (next to the central vertex space CS) preferably but not necessarily has an index of refraction which is lower than that of the forward element or elements of this component.

10. The second or rear one of the two condensing components, that is, component D, is made up of at least two individual lens elements, and includes a cemented surface which is convex toward the central vertex space CS, that is, toward the front of the lens.

11. In this component D, the front element of this cemented surface preferably has an index of refraction which is lower than that of the element at the rear side of the cemented surface.

As above indicated, all of the above mentioned features or characteristics are shared in common by at least some of the specific examples in said U.S. Pat. No. 3,833,290 and at least some of the specific examples disclosed in the present application. These features above mentioned indicate clearly the general type of lens with which the present invention deals, and serve as background for a better understanding of the improvement provided by the present invention, which is distinguished from the above mentioned patent by the further characteristics or features which will now be described.

SUMMARY OF THE INVENTION

The lens of the present invention has all of the features or characteristics listed above, which are present also in said U.S. Pat. No. 3,833,290, and in addition, the lens of the present invention has the further features or characteristics listed below, which distinguish the present invention from the lens disclosed in said patent, and which give the lens of the present invention a surprising superiority.

a. The two front meniscus components A and B are so dimensioned that their mutual power distribution number $\Psi_{BA}$ is within the range or limits of $+1.75$ and $-1.55$. That is, this power distribution number may be positive with a value from zero to $+1.75$ or it may be negative with a value from zero to $-1.55$, but should not exceed these limits. This power distribution number or ratio number $\Psi_{BA}$ may be defined as the quotient of the sum of the refractive powers $\Phi_A$ and $\Phi_B$ of the two components A and B, divided by their difference, $\Phi_B$ minus $\Phi_A$. As well understood in the art, the refractive power of a lens component is the reciprocal of the focal length of that component.

b. The air lens $\alpha$ between the first component A and the second component B, and the air lens $\beta$ between the second component B and third component C, are so dimensioned relative to each other that their refractive power distribution number $\bar{\Psi}_{\beta\alpha}$ is within the limits of +0.15 and −1.85. That is, this power distribution number of these two air lenses may have a positive value from zero to +0.15, or a negative value from zero to −1.85, but should not exceed these limits in either direction. The refractive power distribution number or value with respect to these air lenses may be defined as the quotient of the difference of the surface power sums $\theta_\beta - \theta_\alpha$ of these two air lenses divided by the sum $\theta_\beta + \theta_\alpha$ of the surface power sums of the two lens surfaces enclosing the respective air lenses.

This dimensioning of the two front negative components A and B, and dimensioning of the air lenses between components A and B and between components B and C, results in surprisingly superior optical performance of the lens of the present invention, as compared with the lens of said U.S. Pat. No. 3,833,290, which patented lens is otherise quite similar to the present lens, as already indicated. These superior results are attained without the necessity of using any extreme types of glass. Normal glasses may be used throughout, as shown by the glass data in the specific examples given below.

This new lens of the present invention provides a wide angle lens of medium aperture, with a greatly increased picture performance achieving a sharpness of the photographing of distant real points which is extremely close to the ideal Rayleigh limit, with simultaneous assurance of a technically dependable realizability by the extensive relaxing and resultant reduction in sensitivity of the individual lens components.

At the front or object side of the lens, the lateral as well as the central rays coming from the remote object enter the lens and pass through the components near the front of the lens free or substantially free of aberration, when the components themselves and the air lenses between them are dimensioned in the manner indicated above. It may be noted in this connection that the dispersing power of the front dispersing components A and B considered together is a relatively slight or mild dispersing power within the limits mentioned in item 4 of the numbered items listed in the discussion of the background of the invention. This avoids the difficulties encountered when the forward components of the lens have a strong dispersing or negative power, as often used in lenses of the prior art, which frequently have front components with a combined dispersing power between the negative limits of −1.21 and −2.40 times the power of the complete lens system. By using only a slight or mild dispersing power in these front dispersing components, it is possible to eliminate the undesired stronger dioptric load which is produced when strong negative components are used at this point.

By proportioning the two front dispersing components A and B in such manner as to comply with the above mentioned new feature or characteristic (a), a particularly favorable reduction of the course of the zonal residual errors of the spherical aberrations is achieved in a technically realizable manner. By proportioning the components A and B and C in such manner that the air lenses $\alpha$ and $\beta$ comply with the above mentioned feature or characteristic (b), a very substantial reduction of the proportions of errors of asymmetry of the coma in the strongly inclined ray beams of finite aperture can be accomplished, producing a desired increase in the image performance. This combination of effects on the lateral focusing process becomes particularly readily understandable when it is borne in mind that in these air lenses, in view of their index of refraction of 1, specifically for these strongly inclined courses of the rays in the widely extended abaxial portions of the picture, particularly large ray-path lengths and angles, of inclination are dioptrically useable, and are purposeful since in the case of high-performance wide-angle lenses of this new type, the extremely high picture quality is to cover both central as well as the lateral portions of the image, throughout the entire field of view, in order to be able to realize fully this desired improvement in the art.

BRIEF DESCRIPTION OF THE DRAWINGS

In the accompanying drawings, which are lens diagrams of the familiar form commonly found in lens patents.

The drawings are not necessarily drawn to scale, and are intended to illustrate the general arrangement and shape of various optical elements according to various specific examples of the invention, rather than illustrating exactly or precisely any one embodiment. Thus each figure of the drawings may serve to illustrate diagrammatically more than one specific embodiment, even through there may be differences in the radii, thicknesses, and spacings of the elements of one example as compared with those of another example illustrated schematically in the same drawing. Also it should be noted that, for the sake of clarity of the diagrammatic or schematic illustration, each separate optical element has been shown somewhat spaced from the next adjacent element, notwithstanding that in some cases there is actually no spacing between the elements, as will be apparent from the tabular data in the specific examples. When the tabular data shows that there is a spacing of zero between two adjacent elements, this means that there is a cemented surface at this point, notwithstanding that the diagrammatic drawings may show the adjacent elements slightly separated, for clarity.

DESCRIPTION OF THE PREFERRED EMBODIMENTS

Fourteen illustrative embodiments or specific examples are disclosed in detail below, in the example tables. The heading of each example table includes a reference to the particular figure of the drawings which serves as a schematic illustration of that particular example. Near the top of the table there is also given information as to the maximum working aperture indicated by the letter f, and the angular field of view in degrees, indicated by $2w_o$, and the back focus or axial distance from the rear surface of the last component to the image plane, when focused on an object at infinity, indicated by $s'_{oo}$.

The components are identified by the letters of the alphabet from A to E in the left hand column of each table. These designations of components by letters from A to E correspond to the designations already used in the foregoing part of this specification. Individual lenses or cemented groups of lenses are identified by the Roman numerals in the next column, while the individual lens elements are designated in the third column from the left by the letter L with a subscript corresponding to the number of the individual lens element, numbered consecutively from front to rear. It should be noted, however, that cemented groups of lenses are indicated by the same numeral with the addition of a letter such as a or b to identify individual elements within the cemented group.

All linear dimensions, such as radii, thicknesses, and spacings, are given not as absolute dimensions, but on the basis of the equivalent focal length of the entire lens assembly or system, as unity. That is, $F = 1.00000$. The radii of curvature of the front surface and rear surface of each element are indicated by R and R', respectively, with a subscript indicating the number of that particular element. Positive values of R or R' indicate surfaces convex toward the front of the lens, and negative values indicates surfaces which are concave toward the front of the lens. The end of the lens toward the distant object is referred to for convenience as the front, and the end toward the image (that is, toward the camera, if the lens is used on a photographic camera) is referred to for convenience as the rear of the lens. The light is assumed, in accordance with conventional lens patent practice, to enter from the front, and to pass through the lens from left to right as indicated by the arrows in the lens diagrams.

Axial thicknesses of the individual elements are indicated in the tables by the letter $d$ with a subscript referring to the identifying number of the particular lens element. Spacings between elements are indicated by the letter $s$ with a subscript corresponding to the identifying number of the lens element in front of the space and the lens element behind the space. For example, $s_{12}$ indicates the space between element 1 and element 2, and $s_{23}$ indicates the space between element 2 and element 3, and so on. Zero spacing indicates lens elements cemented to each other, even though the diagrammatic illustration may show such elements slightly separated, for the sake of clarity of illustration. All spacings greater than zero refer to air spacings.

The index of refraction of the glass used for each element is shown either by the symbol $n$ with a subscript referring to the individual lens element, or by data in a column headed $n_d$, the latter being used for the sake of compactness when the data also includes the Abbe number or dispersive index, in the column headed $v_d$. When an objective is designed for use in only a very narrow spectral range, the refractive index refers specifically to this narrow range. If the lens is to be used over a wide spectral range, as for example in taking color photographs over a substantial spectral range, then instead of monochromatic image-error correction, an achromatism should be brought about over the wider spectral range required. For this purpose, in known manner, the glasses are so determined that the color dispersion of the glasses used, defined by their corresponding $v$ values (Abbe number $v$) then serves to eliminate the chromatic deviations or errors due to the wavelengths which enter into consideration.

During the course of making this invention it was found, by way of confirmation, that upon the development of the socalled initial forms or preforms of the ojectives of the invention, and then in the course of the subsequent technical rough shaping (rough form) in known manner with the first correction normally customary in the Seidel range (third order) the use of one of the standard indices of refraction can take place in a purely routine manner. A convenient index to use for this purpose is the index of refraction for the yellow d-line of the helium spectrum, with a wavelength of 5876 Angstrom units. Data for this wavelength is customarily shown in many commercial catalogues of manufacturers of optical glasses.

A few further remarks about the various examples may be given, before turning to the data tables themselves.

Figure 1:
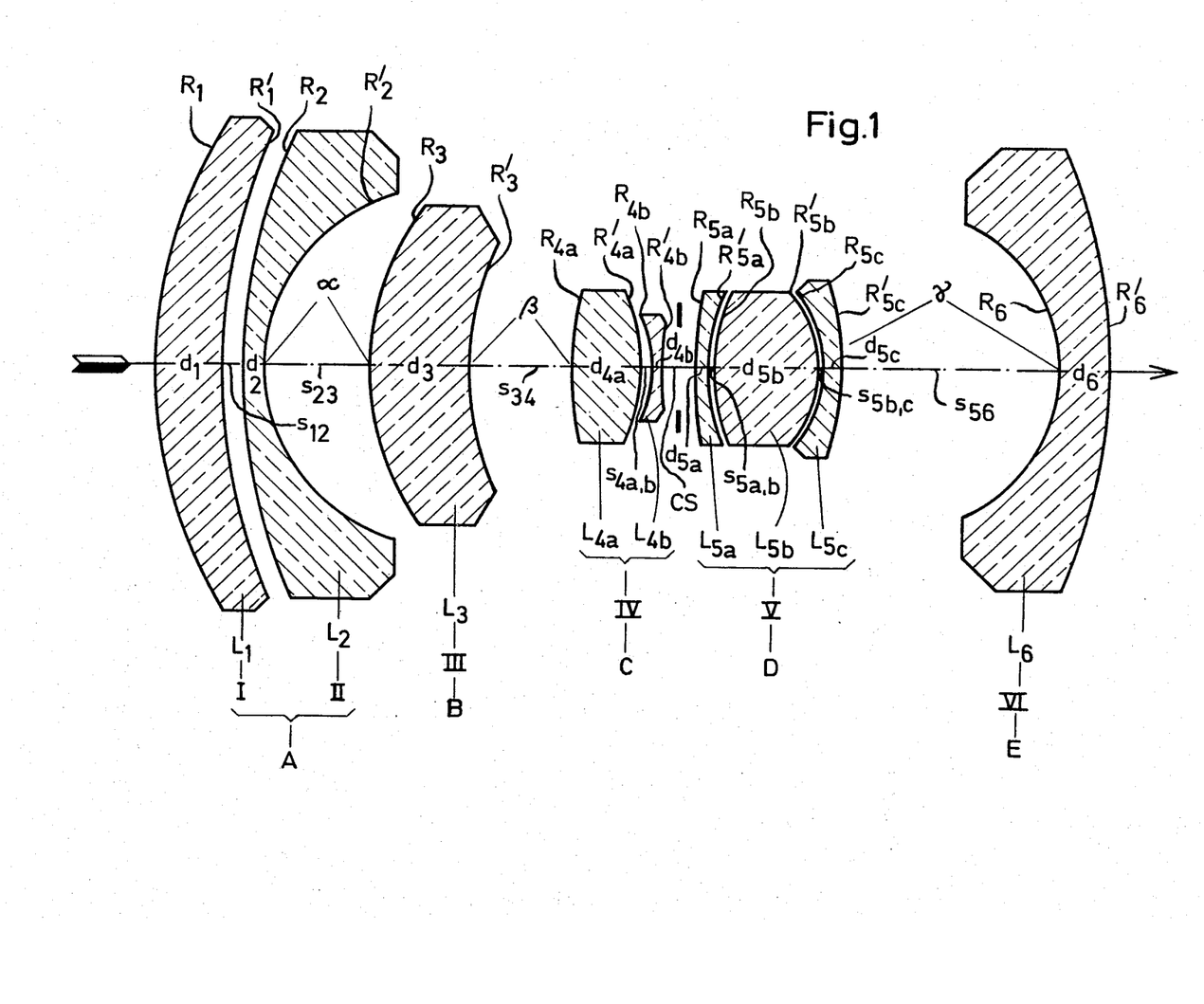
FIG. 1 is a diagram of a lens construction according to one embodiment of the present invention.

In example 1, schematically illustrated in FIG. 1, the front component A is composed of two members I and II both spaced in air. In order to facilitate comparison in all of the other examples, this front component A is constructed only of an individual member I which stands with air on both sides.

Furthermore, in examples 1–3 and 5–7 and 9–11 and 13, the first positive component C, just ahead of the diaphragm space or central vertex space, is developed as a cemented doublet from two individual lens elements, while in examples 4, 8, and 12, this component C is developed as a triplet from three individual lens elements.

Figure 5:
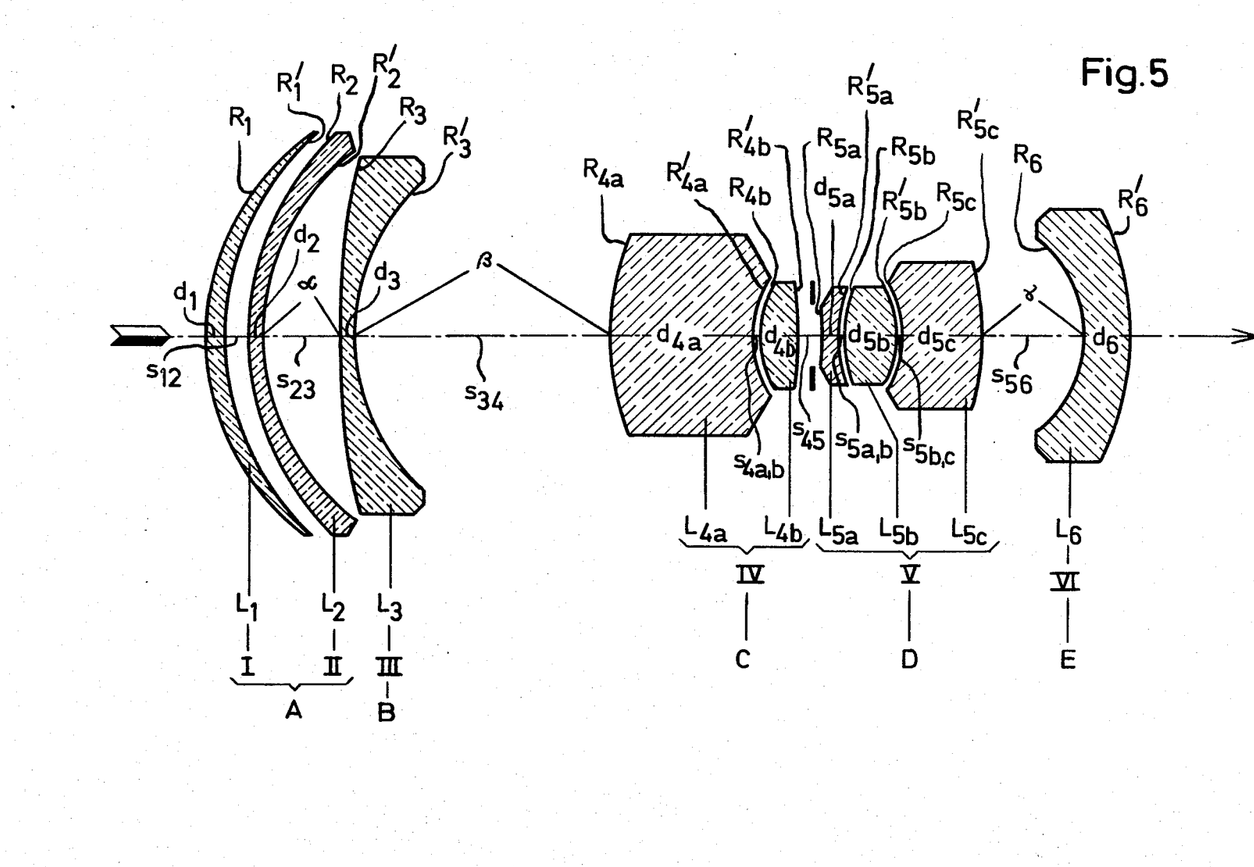
FIG. 5 is a similar diagram illustrating still another embodiment.

Example 1. (FIG. 5)

$F = 1.00000$ f/6.3 $2\omega_o = 62°$ $s'_x = + 0.34985 F$

| | | | | |
|---|---|---|---|---|
| A | I | $L_1$ | $R_1 = + 0.76500$ $R'_1 = + 0.83200$ | $d_1 = 0.06000$ $n_1 = 1.6490$ |
| | | | | $s_{12} = 0.060597$ |
| | II | $L_2$ | $R_2 = + 0.82831$ $R'_2 = + 0.71400$ | $d_2 = 0.05868$ $n_2 = 1.6510$ |
| | | | | $s_{23} = 0.207713$ ($\alpha$) |
| B | III | $L_3$ | $R_3 = + 2.50000$ $R'_3 = + 0.61300$ | $d_3 = 0.04500$ $n_3 = 1.5150$ |
| | | | | $s_{34} = 0.75300$ ($\beta$) |
| C | IV | $L_{4a}$ | $R_{4a} = + 0.72200$ $R'_{4a} = + 0.28200$ | $d_{4a} = 0.44548$ $n_{4a} = 1.7160$ |
| | | | | $s_{4ab} = 0$ |
| | | $L_{4b}$ | $R_{4b} = + 0.28200$ $R'_{4b} = - 1.52160$ | $d_{4b} = 0.11062$ $n_{4b} = 1.7170$ |
| | | | | CS = $s_{45} = 0.07500$ |
| D | V | $L_{5a}$ | $R_{5a} = - 0.83200$ $R'_{5a} = + 0.28200$ | $d_{5a} = 0.04000$ $n_{5a} = 1.5480$ |
| | | | | $s_{5ab} = 0$ |
| | | $L_{5b}$ | $R_{5b} = + 0.28200$ $R'_{5b} = - 0.23500$ | $d_{5b} = 0.18582$ $n_{5b} = 1.6183$ |
| | | | | $s_{5bc} = 0$ |
| | | $L_{5c}$ | $R_{5c} = - 0.23500$ $R'_{5c} = - 0.70200$ | $d_{5c} = 0.24793$ $n_{5c} = 1.7135$ |
| | | | | $s_{56} = 0.29729$ ($\gamma$) |
| E | VI | $L_6$ | $R_6 = - 0.36130$ $R'_6 = - 0.855552$ | $d_6 = 0.13820$ $n_6 = 1.4640$ |

Figure 2:
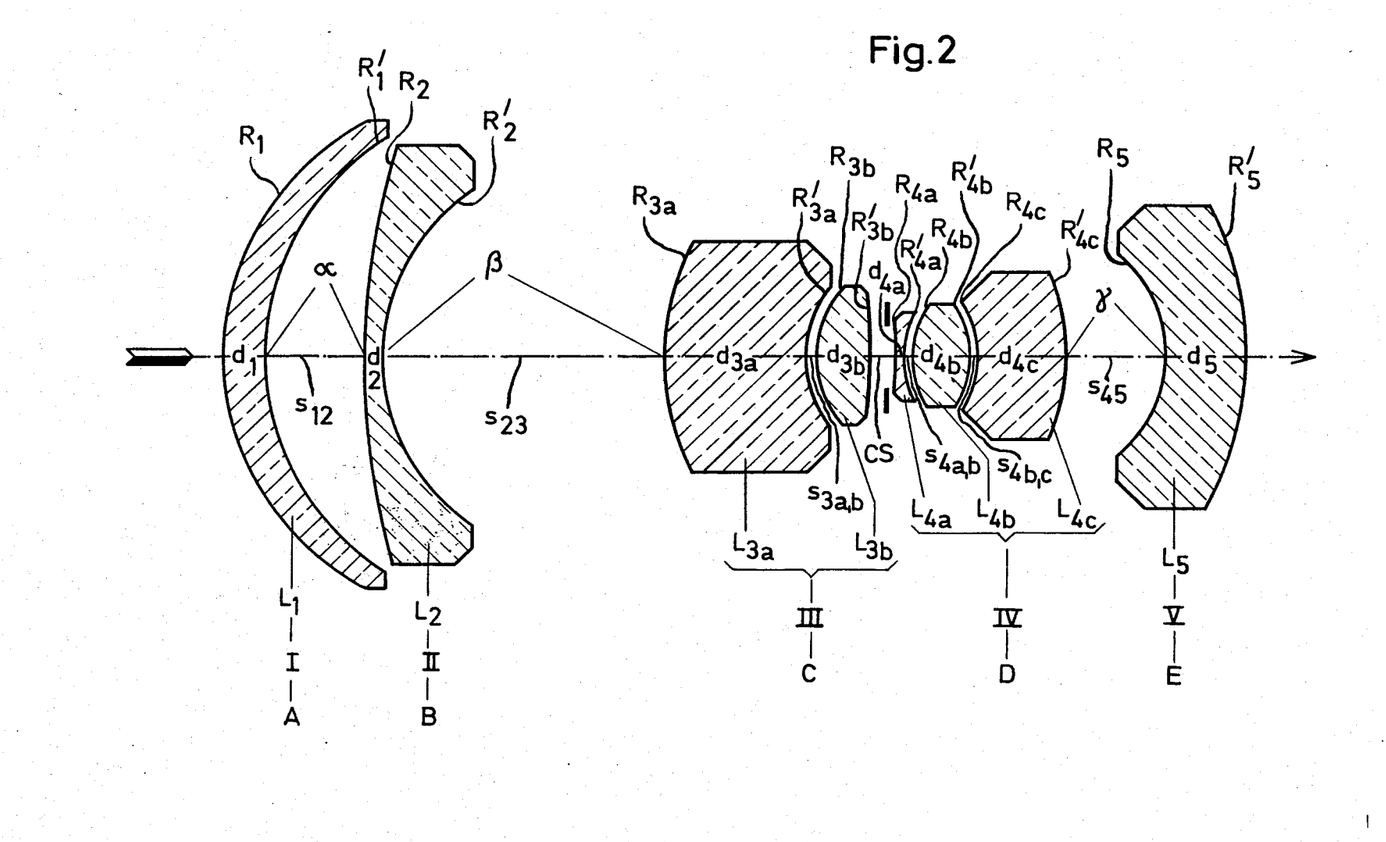
FIG. 2 is a similar diagram illustrating another embodiment of the invention.

Example 2. (FIG. 2)

$F = 1.00000$ f/6.0 $2\omega_o = 620$ $s'_x = + 0.46328 F$

| | | | | |
|---|---|---|---|---|
| A | I | $L_1$ | $R_1 = + 0.6600$ $R'_1 = + 0.5200$ | $d_1 = 0.0500$ $n_1 = 1.488$ |
| | | | | $s_{12} = 0.1050$ ($\alpha$) |
| B | II | $L_2$ | $R_2 = + 1.7500$ | $d_2 = 0.0300$ $n_2 = 1.488$ |

-continued

Example 2. (FIG. 2)
F = 1.00000    f/6.0    $2\omega_o = 62°$    $s'_z = +0.46328\ F$

| | | | | |
|---|---|---|---|---|
| | | $R'_2 = +0.4300$ | $s_{23} = 0.4880\ (\beta)$ | |
| | | $R_{3a} = +0.560$ | | |
| C | III ⟨L_{3a} | $R'_{3a} = +0.285$ | $d_{3a} = 0.2540$ | $n_{3a} = 1.718$ |
| | L_{3b} | $R_{3b} = +0.285$ | $s_{3ab} = 0$ | |
| | | $R'_{3b} = -1.194$ | $d_{3b} = 0.0620$ | $n_{3b} = 1.615$ |
| | | | CS = $s_{34} = 0.0460$ | |
| | L_{4a} | $R_{4a} = -4.900$ | | |
| | | $R'_{4a} = +0.268$ | $d_{4a} = 0.2170$ | $n_{4a} = 1.561$ |
| D | IV ⟨L_{4b} | $R_{4b} = +0.268$ | $s_{4ab} = 0$ | |
| | | $R'_{4b} = -0.285$ | $d_{4b} = 0.1460$ | $n_{4b} = 1.618$ |
| | L_{4c} | $R_{4c} = -0.285$ | $s_{4bc} = 0$ | |
| | | $R'_{4c} = -1.179$ | $d_{4c} = 0.2450$ | $n_{4c} = 1.720$ |
| | | | $s_{45} = 0.3370\ (\gamma)$ | |
| E | V    L_5 | $R_5 = -0.3510$ | $d_5 = 0.033018$ | $n_5 = 1.621$ |
| | | $R'_5 = -0.6334$ | | |

Example 3. (FIG. 2)
F = 1.00000    f/5.8    $2\omega_o = 62°$    $s'_z = +0.34576\ F$

| | | | | |
|---|---|---|---|---|
| A | I    L_1 | $R_1 = +0.72899$ | $d_1 = 0.105082$ | $n_1 = 1.64213$ |
| | | $R'_1 = +0.70971$ | $s_{12} = 0.378494\ (\alpha)$ | |
| B | II    L_2 | $R_2 = +2.04718$ | $d_2 = 0.059348$ | $n_2 = 1.47104$ |
| | | $R'_2 = +0.63367$ | $s_{23} = 1.158684\ (\beta)$ | |
| | L_{3a} | $R_{3a} = +0.82571$ | $d_{3a} = 0.449393$ | $n_{3a} = 1.71736$ |
| C | III ⟨ | $R'_{3a} = +0.32262$ | $s_{3ab} = 0$ | |
| | L_{3b} | $R_{3b} = +0.32262$ | $d_{3b} = 0.061757$ | $n_{3b} = 1.65267$ |
| | | $R'_{3b} = -1.31867$ | CS = $s_{34} = 0.058106$ | |
| | L_{4a} | $R_{4a} = -0.96265$ | $d_{4a} = 0.103890$ | $n_{4a} = 1.53350$ |
| | | $R'_{4a} = +0.32692$ | $s_{4ab} = 0$ | |
| D | IV ⟨L_{4b} | $R_{4b} = +0.32692$ | $d_{4b} = 0.254880$ | $n_{4b} = 1.65152$ |
| | | $R'_{4b} = -0.27545$ | $s_{4bc} = 0$ | |
| | L_{4c} | $R_{4c} = -0.27545$ | $d_{4c} = 0.252644$ | $n_{4c} = 1.72000$ |
| | | $R'_{4c} = -0.95463$ | $s_{45} = 0.326201\ (\gamma)$ | |
| E | V    L_5 | $R_5 = -0.38531$ | $d_5 = 0.142792$ | $n_5 = 1.46125$ |
| | | $R'_5 = -0.90547$ | | |

Example 4. (FIG. 3)
F = 1.00000    f/4.8    $2\omega_o = 92°$    $s'_z = +0.16667\ F$

Figure 3:
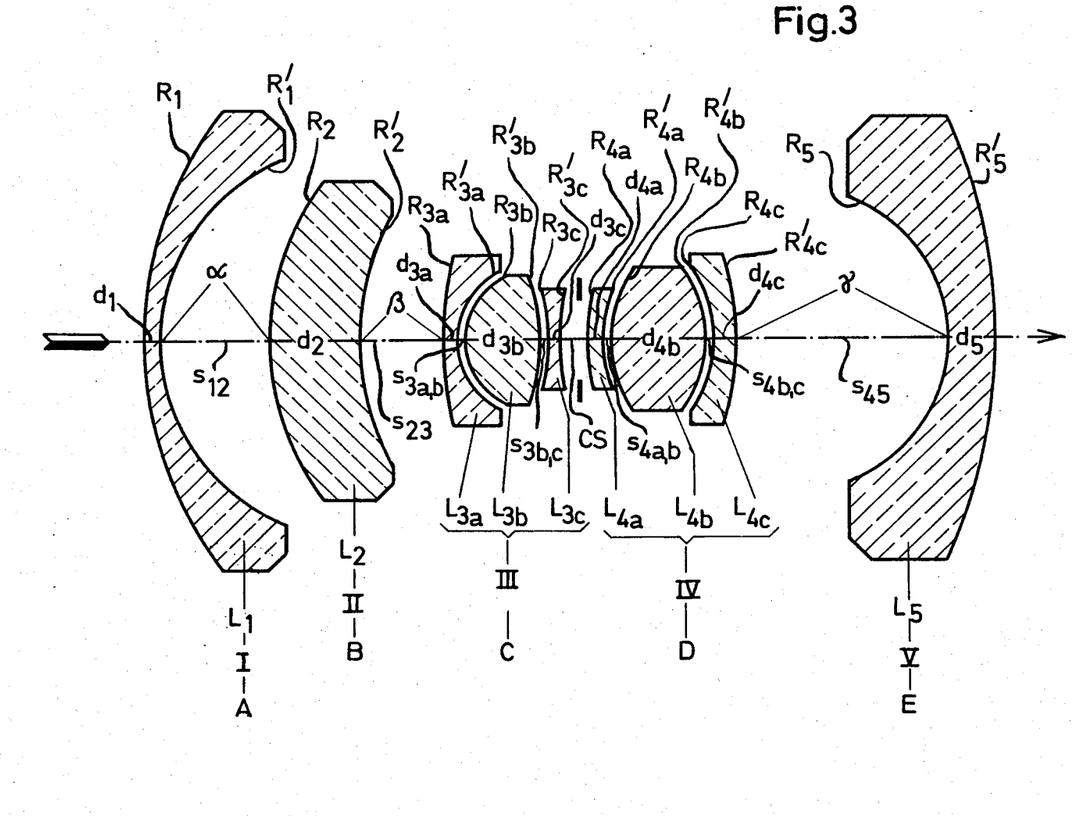
FIG. 3 is a similar diagram illustrating another embodiment of the invention.

| | | | | |
|---|---|---|---|---|
| A | I    L_1 | $R_1 = +1.0650$ | $d_1 = 0.0500$ | $n_1 = 1.659$ |
| | | $R'_1 = +0.5300$ | $s_{12} = 0.3000\ (\alpha)$ | |
| B | II    L_2 | $R_2 = +0.8050$ | $d_2 = 0.2850$ | $n_2 = 1.785$ |
| | | $R'_2 = +0.8750$ | $s_{23} = 0.3000\ (\beta)$ | |
| | L_{3a} | $R_{3a} = +1.2200$ | $d_{32} = 0.0340$ | $n_{32} = 1.734$ |
| | | $R'_{3a} = +0.2260$ | $s_{3ab} = 0$ | |
| C | III L_{3b} | $R_{3b} = +0.2260$ | $d_{3b} = 0.1900$ | $n_{3b} = 1.717$ |
| | | $R'_{3b} = -0.4050$ | $s_{3bc} = 0$ | |
| | L_{3c} | $R_{3c} = -0.4050$ | $d_{3c} = 0.0340$ | $n_{3c} = 1.6730$ |
| | | $R'_{3c} = +1.6050$ | CS = $s_{34} = 0.0950$ | |

Example 4. (FIG. 3)
F = 1.00000    f/4.8    $2\omega_o = 92°$    $s'_z = +0.16667\ F$

| | | | | |
|---|---|---|---|---|
| | L_{4a} | $R_{4a} = +1.1410$ | $d_{4a} = 0.0340$ | $n_{4a} = 1.668$ |
| | | $R'_{4a} = +0.3650$ | $s_{4ab} = 0$ | |
| D | IV ⟨L_{4b} | $R_{4b} = +0.3650$ | $d_{4b} = 0.3330$ | $n_{4b} = 1.698$ |
| | | $R'_{4b} = -0.3650$ | $s_{4bc} = 0$ | |
| | L_{4c} | $R_{4c} = -0.3650$ | $d_{4c} = 0.0600$ | $n_{4c} = 1.847$ |
| | | $R'_{4c} = -0.8270$ | $s_{45} = 0.6280\ (\gamma)$ | |
| E | V    L_5 | $R_5 = -0.4670$ | $d_5 = 0.1430$ | $n_5 = 1.639$ |
| | | $R'_5 = -1.58825$ | | |

Example 5. (FIG. 2)
F = 1.00000    f/5.6    $2\omega_o = 62°$    $s'_z = +0.34332\ F$

| | | | | |
|---|---|---|---|---|
| A | I    L_1 | $R_1 = +0.60641$ | $d_1 = 0.137686$ | $n_1 = 1.50049$ |
| | | $R'_1 = +0.50588$ | $s_{12} = 0.236963\ (\alpha)$ | |
| B | II    L_2 | $R_2 = +6.17438$ | $d_2 = 0.033838$ | $n_2 = 1.46671$ |
| | | $R'_2 = +0.52817$ | $s_{23} = 0.475467\ (\beta)$ | |
| | L_{3a} | $R_{3a} = +0.65168$ | $d_{3a} = 0.409456$ | $n_{3a} = 1.71736$ |
| C | III ⟨ | $R'_{3a} = +0.27270$ | $s_{3ab} = 0$ | |
| | L_{3b} | $R_{3b} = +0.27270$ | $d_{3b} = 0.100942$ | $n_{3b} = 1.65111$ |
| | | $R'_{3b} = -1.63687$ | CS = $s_{34} = 0.123972$ | |
| | L_{4a} | $R_{4a} = -2.89238$ | $d_{4a} = 0.017465$ | $n_{4a} = 1.50825$ |
| | | $R'_{4a} = +0.30925$ | $s_{4ab} = 0$ | |
| D | IV ⟨L_{4b} | $R_{4b} = +0.30925$ | $d_{4b} = 0.196865$ | $n_{4b} = 1.65101$ |
| | | $R'_{4b} = -0.25264$ | $s_{4bc} = 0$ | |
| | L_{4c} | $R_{4c} = -0.25264$ | $d_{4c} = 0.416984$ | $n_{4c} = 1.72000$ |
| | | $R'_{4c} = -1.03084$ | $s_{45} = 0.246255\ (\gamma)$ | |
| E | V    L_5 | $R_5 = -0.37223$ | $d_5 = 0.111302$ | $n_5 = 1.62417$ |
| | | $R'_5 = -0.74601$ | | |

Example 6. (FIG. 2)
F = 1.00000    f/5.6    $2\omega_o = 63°$    $s'_z = +0.29213\ F$

| | | | | |
|---|---|---|---|---|
| A | I    L_1 | $R_1 = +0.64844$ | $d_1 = 0.083260$ | $n_1 = 1.62787$ |
| | | $R'_1 = +0.60824$ | $s_{12} = 0.274528\ (\alpha)$ | |
| B | II    L_2 | $R_2 = +2.62643$ | $d_2 = 0.044723$ | $n_2 = 1.48677$ |
| | | $R'_2 = +0.60573$ | $s_{23} = 0.755528\ (\beta)$ | |
| | L_{3a} | $R_{3a} = +0.70706$ | $d_{3a} = 0.469547$ | $n_{3a} = 1.71736$ |
| C | III ⟨ | $R'_{3a} = +0.28086$ | $s_{3ab} = 0$ | |
| | L_{3b} | $R_{3b} = +0.28086$ | $d_{3b} = 0.083260$ | $n_{3b} = 1.64313$ |
| | | $R'_{3b} = -1.30408$ | CS = $s_{34} = 0.064427$ | |
| | L_{4a} | $R_{4a} = -0.93891$ | $d_{4a} = 0.015852$ | $n_{4a} = 1.51006$ |
| | | $R'_{4a} = +0.29417$ | $s_{4ab} = 0$ | |
| D | IV ⟨L_{4b} | $R_{4b} = +0.29417$ | $d_{4b} = 0.256514$ | $n_{4b} = 1.63922$ |
| | | $R'_{4b} = -0.24176$ | $s_{4bc} = 0$ | |
| | L_{4c} | $R_{4c} = -0.24176$ | $d_{4c} = 0.265011$ | $n_{4c} = 1.72000$ |
| | | $R'_{4c} = -0.80023$ | $s_{45} = 0.290553\ (\gamma)$ | |
| E | V    L_5 | $R_5 = -0.36782$ | $d_5 = 0.210300$ | $n_5 = 1.46068$ |

Example 6. (FIG. 2)

$F = 1.00000$  f/5.6  $2\omega_0 = 63°$  $s'_x = +0.29213\ F$ $R'_5 = -1.06346$

Example 7. (FIG. 2)

$F = 1.00000$  f/5.6  $2\omega_0 = 66°$  $s'_x = +0.30206\ F$ $n_d / \nu_d$

| | | | | | |
|---|---|---|---|---|---|
| A | I | $L_1$ | $R_1 = +0.75149$ | $d_1 = 0.113511$ | 1.64769/33.86 |
| | | | $R'_1 = +0.73007$ | | |
| | | | | $s_{12} = 0.272687\ (\alpha)$ | |
| | | | $R_2 = +2.2757$ | | |
| B | II | $L_2$ | | $d_2 = 0.046970$ | 1.50847/61.19 |
| | | | $R'_2 = +0.58415$ | | |
| | | | | $s_{23} = 0.774483\ (\beta)$ | |
| | | | $R_{3a} = +0.73007$ | $d_{3a} = 0.416206$ | 1.71736/29.52 |
| | | | $R'_{3a} = +0.28041$ | $s_{3ab} = 0$ | |
| C | III | $L_{3a}$, $L_{3b}$ | $R_{3b} = +0.28041$ | $d_{3b} = 0.146129$ | 1.71300/53.85 |
| | | | $R'_{3b} = -1.46737$ | | |
| | | | | $CS = s_{34} = 0.076979$ | |
| | | | $R_{4a} = -0.89963$ | $d_{4a} = 0.015657$ | 1.54883/45.43 |
| | | | $R'_{4a} = +0.26669$ | $s_{4ab} = 0$ | |
| D | IV | $L_{4a}$, $L_{4b}$, $L_{4c}$ | $R_{4b} = +0.26669$ | $d_{4b} = 0.182661$ | 1.61772/49.78 |
| | | | $R'_{4b} = -0.22927$ | $s_{4bc} = 0$ | |
| | | | $R_{4c} = -0.22927$ | $d_{4c} = 0.259640$ | 1.71300/53.85 |
| | | | $R'_{4c} = -0.68928$ | | |
| | | | | $s_{45} = 0.278428\ (\gamma)$ | |
| E | V | $L_5$ | $R_5 = -0.35815$ | $d_5 = 0.210582$ | 1.46450/65.70 |
| | | | $R'_5 = -0.98076$ | | |

Example 8. (FIG. 3)

$F = 1.00000$  f/4.6  $2\omega_0 = 92°$  $s'_x = +0.19685\ F$

| | | | | | |
|---|---|---|---|---|---|
| A | I | $L_1$ | $R_1 = +1.66676$ | $d_1 = 0.076352$ | $n_1 = 1.51264$ |
| | | | $R'_1 = +0.58362$ | | |
| | | | | $s_{12} = 0.351418\ (\alpha)$ | |
| | | | $R_2 = +0.81023$ | | |
| B | II | $L_2$ | | $d_2 = 0.268400$ | $n_2 = 1.80139$ |
| | | | $R'_2 = +1.00036$ | | |
| | | | | $s_{23} = 0.255526\ (\beta)$ | |
| | | | $R_{3a} = +0.85796$ | $d_{3a} = 0.025761$ | $n_{3a} = 1.75055$ |
| | | | $R'_{3a} = +0.28951$ | $s_{3ab} = 0$ | |
| C | III | $L_{3a}$, $L_{3b}$, $L_{3c}$ | $R_{3b} = +0.28951$ | $d_{3b} = 0.177835$ | $n_{3b} = 1.67912$ |
| | | | $R'_{3b} = -0.74739$ | $s_{3bc} = 0$ | |
| | | | $R_{3c} = -0.74739$ | $d_{3c} = 0.029895$ | $n_{3c} = 1.60558$ |
| | | | $R'_{3c} = +1.20152$ | | |
| | | | | $CS = s_{34} = 0.125000$ | |
| | | | $R_{4a} = +1.82911$ | $d_{4a} = 0.041247$ | $n_{4a} = 1.65157$ |
| | | | $R'_{4a} = +0.45199$ | $s_{4ab} = 0$ | |
| D | IV | $L_{4a}$, $L_{4b}$, $L_{4c}$ | $R_{4b} = +0.45199$ | $d_{4b} = 0.400001$ | $n_{4b} = 1.75360$ |
| | | | $R'_{4b} = -0.36980$ | $s_{4bc} = 0$ | |
| | | | $R_{4c} = -0.36980$ | $d_{4c} = 0.089318$ | $n_{4c} = 1.84666$ |
| | | | $R'_{4c} = -0.96018$ | | |
| | | | | $s_{45} = 0.549608\ (\gamma)$ | |
| E | V | $L_5$ | $R_5 = -0.50039$ | $d_5 = 0.059935$ | $n_5 = 1.58903$ |
| | | | $R'_5 = -2.07556$ | | |

Figure 4:
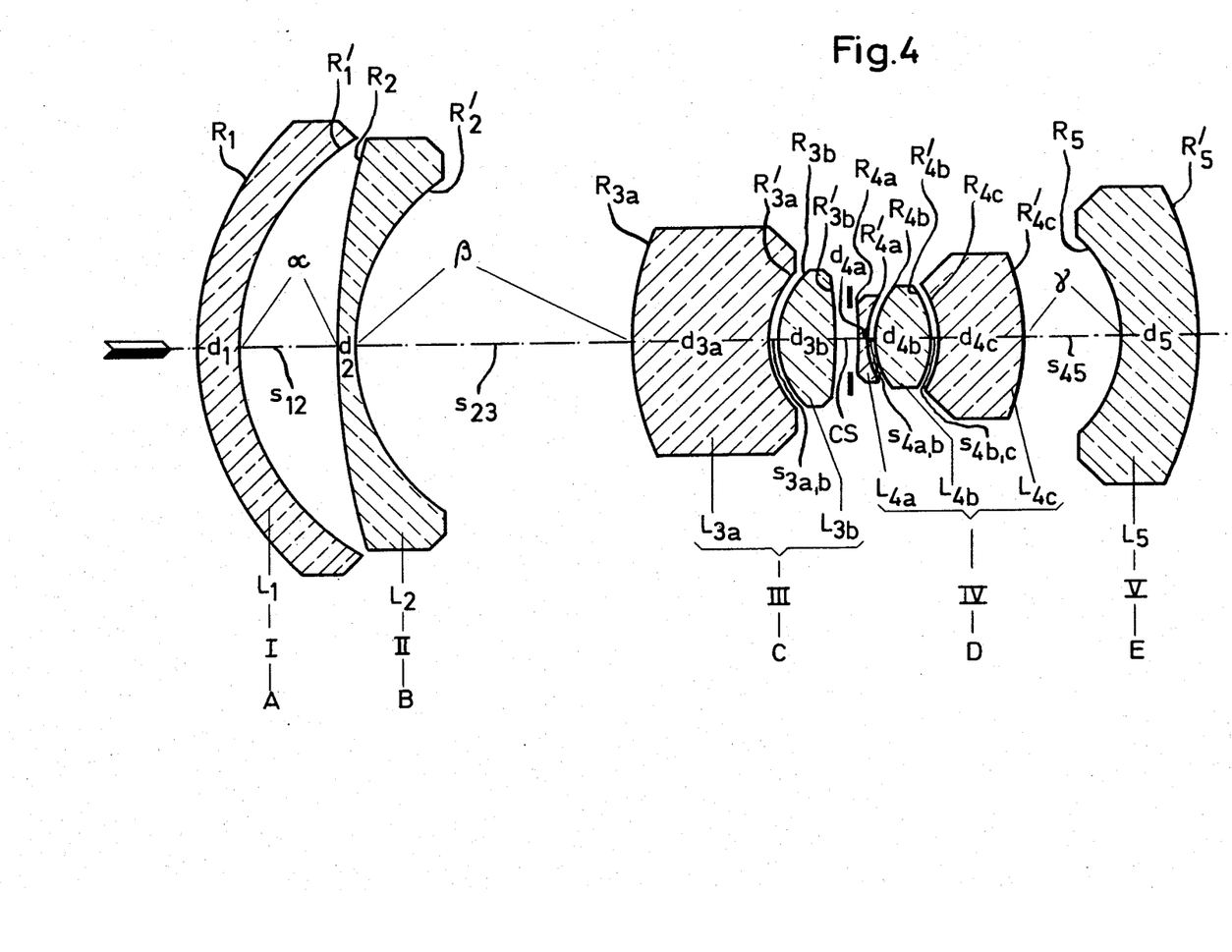
FIG. 4 is a similar diagram illustrating another embodiment of the invention.

Example 9. (FIG. 4)

$F = 1.00000$  f/6.0  $2\omega_0 = 62°$  $s'_x = +0.50401\ F$ $n_d / \nu_d$

| | | | | | |
|---|---|---|---|---|---|
| A | I | $L_1$ | $R_1 = +0.62490$ | $d_1 = 0.046875$ | 1.48749/70.45 |
| | | | $R'_1 = +0.49801$ | | |
| | | | | $s_{12} = 0.117122\ (\alpha)$ | — |
| | | | $R_2 = +1.74276$ | | |
| B | II | $L_2$ | | $d_2 = 0.029518$ | 1.48749/70.45 |
| | | | $R'_2 = +0.40190$ | | |
| | | | | $s_{23} = 0.490157\ (\beta)$ | |
| | | | $R_{3a} = +0.55230$ | $d_{3a} = 0.219002$ | 1.71736/29.52 |
| | | | $R'_{3a} = +0.28403$ | $s_{3ab} = 0$ | |
| C | III | $L_{3a}$, $L_{3b}$ | $R_{3b} = +0.28403$ | $d_{3b} = 0.116746$ | 1.61484/51.15 |
| | | | $R'_{3b} = -1.08295$ | | |
| | | | | $CS = s_{34} = 0.062642$ | |
| | | | $R_{4a} = -5.60031$ | $d_{4a} = 0.183993$ | 1.56138/45.24 |
| | | | $R'_{4a} = +0.24763$ | $s_{4ab} = 0$ | |
| D | IV | $L_{4a}$, $L_{4b}$, $L_{4c}$ | $R_{4b} = +0.24763$ | $d_{4b} = 0.167948$ | 1.61795/52.59 |
| | | | $R'_{4b} = -0.26158$ | $s_{4bc} = 0$ | |
| | | | $R_{4c} = -0.26158$ | $d_{4c} = 0.206808$ | 1.72000/50.42 |
| | | | $R'_{4c} = -1.62926$ | | |
| | | | | $s_{45} = 0.337289\ (\gamma)$ | |
| E | V | $L_5$ | $R_5 = -0.32745$ | $d_5 = 0.025142$ | 1.62041/60.29 |
| | | | $R'_5 = -0.48265$ | | |

Corrected for infinity and the use of a plane-parallel film pressure plate in the picture plane, with a thickness of $d_p = 0.66527\ F$ and an index of refraction $n_d = 1.51680$ and an Abbe number $\nu_d = 64.12$ for the pressure plate glass.

Example 10. (FIG. 4)

$F = 1.00000$  f/5.6  $2\omega_0 = 62°$  $s'_x = +0.46343\ F$ $n_d / \nu_d$

| | | | | | |
|---|---|---|---|---|---|
| A | I | $L_1$ | $R_1 = +0.62385$ | $d_1 = 0.049905$ | 1.48749/70.45 |
| | | | $R'_1 = +0.54023$ | | |
| | | | | $s_{12} = 0.108482\ (\alpha)$ | |
| | | | $R_2 = +1.78392$ | | |
| B | II | $L_2$ | | $d_2 = 0.028470$ | 1.48749/70.45 |
| | | | $R'_2 = +0.41992$ | | |
| | | | | $s_{23} = 0.527684\ (\beta)$ | |
| | | | $R_{3a} = +0.57641$ | $d_{3a} = 0.252797$ | 1.71736/29.52 |
| | | | $R'_{3a} = +0.28271$ | $s_{3ab} = 0$ | |
| C | III | $L_{3a}$, $L_{3b}$ | $R_{3b} = +0.28271$ | $d_{3b} = 0.062995$ | 1.61484/51.15 |
| | | | $R'_{3b} = -1.19216$ | | |
| | | | | $CS = s_{34} = 0.045814$ | |
| | | | $R_{4a} = -4.88464$ | $d_{4a} = 0.216964$ | 1.56138/45.24 |
| | | | $R'_{4a} = +0.26689$ | $s_{4ab} = 0$ | |
| D | IV | $L_{4a}$, $L_{4b}$, $L_{4c}$ | $R_{4b} = +0.26689$ | $d_{4b} = 0.147261$ | 1.61795/52.59 |
| | | | $R'_{4b} = -0.29094$ | $s_{4bc} = 0$ | |
| | | | $R_{4c} = -0.29094$ | $d_{4c} = 0.244616$ | 1.72000/50.42 |
| | | | $R'_{4c} = -1.19216$ | | |
| | | | | $s_{45} = 0.336572\ (\gamma)$ | |
| E | V | $L_5$ | $R_5 = -0.35081$ | $d_5 = 0.032397$ | 1.62041/60.29 |
| | | | $R'_5 = -0.63291$ | | |

Corrected for infinity and the use of a plane-parallel film pressure plate in the picture plane, with a thickness of $d_p = 0.065449\ F$ and index of refraction $n_d = 1.51680$ and an Abbe number $\nu_d = 64.12$ for the pressure plate glass.

Example 11. (FIG. 2)

F = 1.00000   f/5.6   $2\omega_o = 63°$   $s'_z = +0.35027$ F

| | | | | | $n_d / \nu_d$ |
|---|---|---|---|---|---|
| A | I | $L_1$ | $R_1 = +0.76434$ | $d_1 = 0.128618$ | 1.64769/33.86 |
| | | | $R'_1 = +0.73737$ | $s_{12} = 0.257982\ (\alpha)$ | |
| B | II | $L_2$ | $R_2 = +2.52384$ | $d_2 = 0.044780$ | 1.51454/54.68 |
| | | | $R'_2 = +0.59413$ | $s_{23} = 0.772950\ (\beta)$ | |
| C | III | $L_{3a}$ | $R_{3a} = +0.72680$ | $d_{3a} = 0.446554$ | 1.71736/29.52 |
| | | | $R'_{3a} = +0.28117$ | $s_{3ab} = 0$ | |
| | | $L_{3b}$ | $R_{3b} = +0.28117$ | $d_{3b} = 0.114189$ | 1.71300/53.85 |
| | | | $R'_{3b} = -1.45017$ | $CS = s_{34} = 0.075628$ | |
| D | IV | $L_{4a}$ | $R_{4a} = -0.83330$ | $d_{4a} = 0.039307$ | 1.54883/45.43 |
| | | | $R'_{4a} = +0.27124$ | $s_{4ab} = 0$ | |
| | | $L_{4b}$ | $R_{4b} = +0.27124$ | $d_{4b} = 0.183846$ | 1.61772/49.78 |
| | | | $R'_{4b} = -0.23152$ | $s_{4bc} = 0$ | |
| | | $L_{4c}$ | $R_{4c} = -0.23152$ | $d_{4c} = 0.246538$ | 1.71300/53.85 |
| | | | $R'_{4c} = -0.70115$ | $s_{45} = 0.297288\ (\gamma)$ | |
| E | V | $L_5$ | $R_5 = -0.36167$ | $d_5 = 0.137325$ | 1.46450/65.70 |
| | | | $R'_5 = -0.85768$ | | |

Example 12. (FIG. 3)

F = 1.00000   f/4.7   $2\omega_o = 92°$   $s'_z = +0.16614$ F

| | | | | | $n_d / \nu_d$ |
|---|---|---|---|---|---|
| A | I | $L_1$ | $R_1 = +1.04603$ | $d_1 = 0.060577$ | 1.65844/50.88 |
| | | | $R'_1 = +0.54347$ | $s_{12} = 0.328699\ (\alpha)$ | |
| B | II | $L_2$ | $R_2 = +0.83689$ | $d_2 = 0.275891$ | 1.78470/26.08 |
| | | | $R'_2 = +0.87379$ | $s_{23} = 0.295776\ (\beta)$ | |
| C | III | $L_{3a}$ | $R_{3a} = +1.21665$ | $d_{3a} = 0.022914$ | 1.73350/51.65 |
| | | | $R'_{3a} = +0.22585$ | $s_{3ab} = 0$ | |
| | | $L_{3b}$ | $R_{3b} = +0.22585$ | $d_{3b} = 0.188975$ | 1.71700/47.99 |
| | | | $R'_{3b} = -0.40172$ | $s_{3bc} = 0$ | |
| | | $L_{3c}$ | $R_{3c} = -0.40172$ | $d_{3c} = 0.033054$ | 1.67270/32.20 |
| | | | $R'_{3c} = -1.58797$ | $CS = s_{34} = 0.096397$ | |
| D | IV | $L_{4a}$ | $R_{4a} = +1.14038$ | $d_{4a} = 0.034239$ | 1.66755/41.93 |
| | | | $R'_{4a} = +0.36061$ | $s_{4ab} = 0$ | |
| | | $L_{4b}$ | $R_{4b} = +0.36061$ | $d_{4b} = 0.331332$ | 1.69761/38.56 |
| | | | $R'_{4b} = -0.36844$ | $s_{4bc} = 0$ | |
| | | $L_{4c}$ | $R_{4c} = -0.36844$ | $d_{4c} = 0.059261$ | 1.84666/23.82 |
| | | | $R'_{4c} = -0.83089$ | $s_{45} = 0.628162\ (\gamma)$ | |
| E | V | $L_5$ | $R_5 = -0.46722$ | $d_5 = 0.143806$ | 1.63854/55.38 |
| | | | $R'_5 = -1.58797$ | | |

Figure 6:
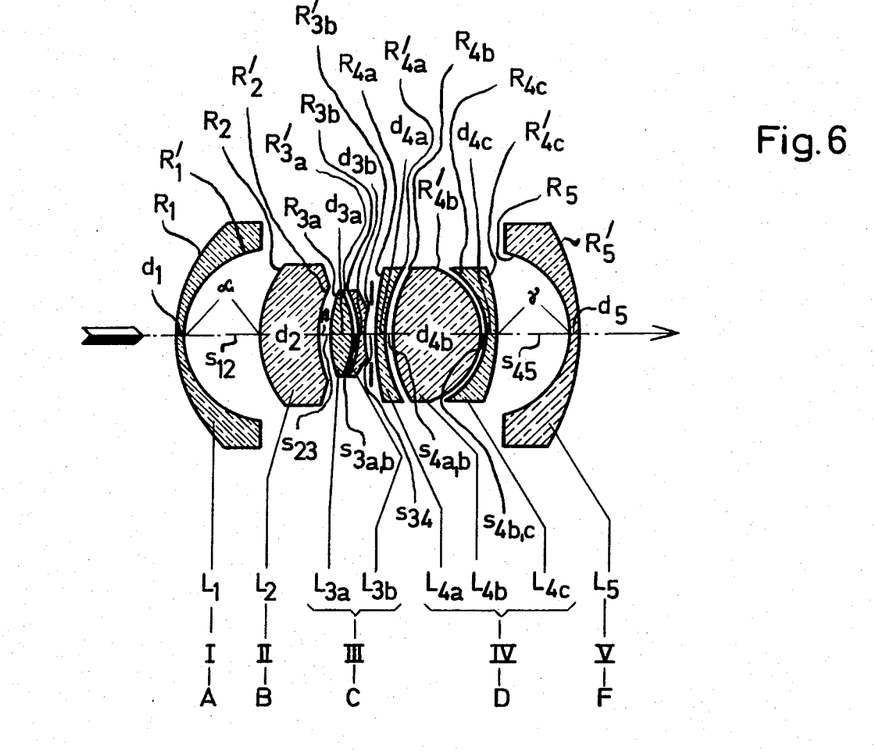
FIG. 6 is a similar diagram illustrating a further embodiment of the invention.

Example 13. (FIG. 6)

F = 1.00000   f/4.5   $2\omega_o = 92°$   $s'_z = +0.27371$ F

| | | | | | $n_d / \nu_d$ |
|---|---|---|---|---|---|
| A | I | $L_1$ | $R_1 = +0.81734$ | $d_1 = 0.050884$ | 1.63854/55.38 |
| | | | $R'_1 = +0.46958$ | $s_{12} = 0.420381\ (\alpha)$ | |
| B | II | $L_2$ | $R_2 = +0.61730$ | $d_2 = 0.310132$ | 1.62004/36.37 |
| | | | $R'_2 = +0.46627$ | $s_{23} = 0.076848\ (\beta)$ | |
| C | III | $L_{3a}$ | $R_{3a} = +0.86571$ | $d_{3a} = 0.135560$ | 1.78831/47.37 |
| | | | $R'_{3a} = -0.42462$ | $s_{3ab} = 0$ | |
| | | $L_{3b}$ | $R_{3b} = -0.42462$ | $d_{3b} = 0.044491$ | 1.67270/32.20 |
| | | | $R'_{3b} = +2.32364$ | $CS = s_{34} = 0.060930$ | |
| D | IV | $L_{4a}$ | $R_{4a} = +1.66640$ | $d_{4a} = 0.039794$ | 1.46450/65.70 |
| | | | $R'_{4a} = +0.45963$ | $s_{4ab} = 0$ | |
| | | $L_{4b}$ | $R_{4b} = +0.45963$ | $d_{4b} = 0.553723$ | 1.66755/41.93 |
| | | | $R'_{4b} = -0.37843$ | $s_{4bc} = 0$ | |
| | | $L_{4c}$ | $R_{4c} = -0.37843$ | $d_{4c} = 0.032618$ | 1.84666/23.82 |
| | | | $R'_{4c} = -0.84115$ | $s_{45} = 0.418163\ (\gamma)$ | |
| E | V | $L_5$ | $R_5 = -0.44657$ | $d_5 = 0.050232$ | 1.51009/63.52 |
| | | | $R'_5 = -1.23986$ | | |

Example 14. (FIG. 3)

F = 1.00000   f/4.5   $2\omega_o = 93°$   $s'_z = +0.17408$ F

| | | | | | $n_d / \nu_d$ |
|---|---|---|---|---|---|
| A | I | $L_1$ | $R_1 = +1.12715$ | $d_1 = 0.084056$ | 1.65844/50.88 |
| | | | $R'_1 = +0.56162$ | $s_{12} = 0.374925\ (\alpha)$ | |
| B | II | $L_2$ | $R_2 = +1.00544$ | $d_2 = 0.307667$ | 1.78470/26.08 |
| | | | $R'_2 = +1.17681$ | $s_{23} = 0.278572\ (\beta)$ | |
| C | III | $L_{3a}$ | $R_{3a} = +1.39179$ | $d_{3a} = 0.023189$ | 1.73350/51.65 |
| | | | $R'_{3a} = +0.23435$ | $s_{3ab} = 0$ | |
| | | $L_{3b}$ | $R_{3b} = +0.23435$ | $d_{3b} = 0.199818$ | 1.71700/47.99 |
| | | | $R'_{3b} = -0.36466$ | $s_{3bc} = 0$ | |
| | | $L_{3c}$ | $R_{3c} = -0.36466$ | $d_{3c} = 0.034594$ | 1.68893/31.17 |
| | | | $R'_{3c} = -1.69869$ | $CS = s_{34} = 0.086615$ | |
| D | IV | $L_{4a}$ | $R_{4a} = +1.01170$ | $d_{4a} = 0.056195$ | 1.67003/47.12 |
| | | | $R'_{4a} = +0.35926$ | $s_{4ab} = 0$ | |
| | | $L_{4b}$ | $R_{4b} = +0.35926$ | $d_{4b} = 0.293940$ | 1.69761/38.56 |
| | | | $R'_{4b} = -0.36913$ | $s_{4bc} = 0$ | |
| | | $L_{4c}$ | $R_{4c} = -0.36913$ | $d_{4c} = 0.058820$ | 1.84666/23.82 |
| | | | $R'_{4c} = -0.84358$ | $s_{45} = 0.601778\ (\gamma)$ | |
| E | V | $L_5$ | $R_5 = -0.44655$ | $d_5 = 0.172141$ | 1.63854/55.38 |
| | | | $R'_5 = -1.51703$ | | |

In accordance with customary usage in literature relating to lenses, the air lens refraction $\phi\alpha$ and $\phi\beta$ respectively, of the air lenses $\alpha$ and $\beta$ is indicated as the area of refraction sum of the lens surfaces enclosing the corresponding air lens. Thus we have, in the general manner of notation $$\phi_\delta = \phi_\delta + \phi_\delta$$

for any desired surface pair (of the order $\delta$) which is associated with each other, and in which the surface power of refraction $\phi x$ for an individual area of the order $x$ is written in known manner as $$\phi_x = (n'_x - n_x) : R_x$$

In the following two tables, certain numerical values are given with regard to the illustrative examples already disclosed. In Table I, the paraxial refractive power $\Phi_{AB}$ for the combination of the two front components A and B is shown for each of the 14 examples, this refractive power being expressed in proportion to the equivalent refractive power $\Phi$ of the entire lens system. It will be noted that all of these values in Table I lie within the previously stated range of a negative value from 1.19 to 0.24.

In Table II, values are given for each specific example, for the previously discussed power distribution numbers $\Psi_{BA}$ and $\overline{\Psi_{\beta\alpha}}$ for the component combination A and B, and for the air lens combination $\alpha$ and $\beta$. These values are given in the respective columns (a) and (b) of Table II, corresponding to the previous description of these power distribution numbers as characteristic features (a) and (b) of the lens of the present invention. It will be noted that all of the values given in column (a) fall within the previously stated range for this feature, namely, the range from +1.75 to −1.55. In column (b), the values all fall within the previously stated range for this characteristic feature (b), namely, the range from +0.15 to −1.85.

It may be mentioned also that if one takes the highest value from column (a) of Table II, which is the value of +1.5216 given for example 2, and adds to it the usual tolerance limit of 5%, one gets a value of +1.5977. Similarly, if one takes the lowest value from this column (a), namely, the value of −1.2927 given for example 13, and applies the usual 5% for tolerance, the figure becomes −1.3573. Likewise, referring to the values in column (b), the largest value (example 13) is +0.0824. Applying the 5% tolerance, the figure becomes +0.0865. The lowest value (example 6) is −1.6634, and with the tolerance of 5%, this becomes −1.7466. These figures are mentioned to explain why these figures appear in some of the claims.

Similarly, if a 5% tolerance is applied to the numerical values in Table 1, the high and low limits become −0.2494 and −1.1567.

Table I.

| Example | $\Phi_{AB}$ |
|---|---|
| 1 | − 0.5871 $\Phi$ |
| 2 | − 1.0240 $\Phi$ |
| 3 | − 0.4447 $\Phi$ |
| 4 | − 0.4347 $\Phi$ |
| 5 | − 0.8534 $\Phi$ |
| 6 | − 0.5987 $\Phi$ |
| 7 | − 0.5700 $\Phi$ |
| 8 | − 0.2625 $\Phi$ |
| 9 | − 1.1016 $\Phi$ |
| 10 | − 0.9672 $\Phi$ |
| 11 | − 0.5811 $\Phi$ |
| 12 | − 0.4344 $\Phi$ |
| 13 | − 0.7684 $\Phi$ |
| 14 | − 0.3776 $\Phi$ |

Table II

| Example | Features (a) $\Psi_{BA}$ | Features (b) $\overline{\Psi_{\beta\alpha}}$ |
|---|---|---|
| 1 | + 1.0 | − 1.5483 |
| 2 | + 1.5216 | − 1.5749 |
| 3 | + 0.8985 | − 1.4567 |
| 4 | − 0.4685 | − 0.7779 |
| 5 | + 1.2484 | − 1.6234 |
| 6 | + 1.0428 | − 1.6634 |
| 7 | + 0.9181 | − 1.4066 |
| 8 | − 0.2909 | − 0.2006 |
| 9 | + 1.4647 | − 1.2802 |
| 10 | + 1.2481 | − 1.3066 |
| 11 | + 0.9207 | − 1.4371 |
| 12 | − 0.5324 | + 0.0373 |
| 13 | − 1.2927 | + 0.0824 |
| 14 | − 0.4626 | − 0.4742 |

What is claimed is:
1. A wide angle lens comprising
   1. at least five components air spaced from each other and containing at least eight individual lens elements,
   2. said components including two components each having, as a whole, a converging action, said two converging components being axially separated from each other by an air space in which a diaphragm may be placed,
   3. two meniscus components axially separated from each other by an air space constituting a first air lens, the two meniscus components in combination with each other having a dispersing action,
   4. said two meniscus components both having front surfaces which are convex toward the front,
   5. the rear one of said two meniscus components being axially separated from the front one of said two converging components by an air space constituting a second air lens,
   6. a negative component spaced axially behind the rear one of said two converging components, said negative component having a rear surface which is convex toward the rear,
   7. the front one of said two converging components having at least two individual lens elements,
   8. the rear one of said two converging components having at least two individual lens elements and at least one cemented surface which is convex toward the front,
   said lens being characterized by the fact that
   a. said two meniscus components with diverging action are so dimensioned that their mutual refractive power distribution number is substantially within the limits of +1.5977 and −1.3573, and
   b. the surfaces bounding said first air lens and said second air lens are so dimensioned that the refractive power distribution number of these two air lenses is within the limits of +0.0865 and −1.7466.
2. A lens as defined in claim 1, wherein said two meniscus components in combination with each other have a combined refractive power with a negative value within the limits of 1.1567 and 0.2494 times the equivalent refractive power of the entire lens.
3. A lens as defined in claim 1, wherein the front one of said two converging components has a rear lens element with an index of refraction lower than that of the lens element next in front of it.
4. A lens as defined in claim 1, wherein the rear one of said two converging components has a lens element on the forward side of said cemented surface with an index of refraction lower than that of the lens element on the rear side of said cemented surface.

5. A lens as defined in claim 1, wherein the characteristics of the lens components and their spatial relationship to each other are substantially as indicated below:

| F = 1.00000 | f/6.3 | $2\omega_o = 62°$ | $s'_x = + 0.34985 F$ |
|---|---|---|---|

A I $L_1$
$R_1 = + 0.76500$
$R'_1 = + 0.83200$
$d_1 = 0.06000$  $n_1 = 1.6490$
$s_{12} = 0.060597$

II $L_2$
$R_2 = + 0.82831$
$R'_2 = + 0.71400$
$d_2 = 0.05868$  $n_2 = 1.6510$
$s_{23} = 0.207713 \ (\alpha)$ B III $L_3$
$R_3 = + 2.50000$
$R'_3 = + 0.61300$
$d_3 = 0.04500$  $n_3 = 1.5150$
$s_{34} = 0.75300 \ (\beta)$ C IV
$L_{4a}$
$R_{4a} = + 0.72200$
$R'_{4a} = + 0.28200$
$d_{4a} = 0.44548$  $n_{4a} = 1.7160$
$s_{4ab} = 0$ $L_{4b}$
$R_{4b} = + 0.28200$
$R'_{4b} = - 1.52160$
$d_{4b} = 0.11062$  $n_{4b} = 1.7170$
$CS = s_{45} = 0.07500$ D V
$L_{5a}$
$R_{5a} = - 0.83200$
$R'_{5a} = + 0.28200$
$d_{5a} = 0.04000$  $n_{5a} = 1.5480$
$s_{5ab} = 0$ $L_{5b}$
$R_{5b} = + 0.28200$
$R'_{5b} = - 0.23500$
$d_{5b} = 0.18582$  $n_{5b} = 1.6183$
$s_{5bc} = 0$ $L_{5c}$
$R_{5c} = - 0.23500$
$R'_{5c} = - 0.70200$
$d_{5c} = 0.24793$  $n_{5c} = 1.7135$
$s_{56} = 0.29729 \ (\gamma)$ E VI $L_6$
$R_6 = - 0.36130$
$R'_6 = - 0.855552$
$d_6 = 0.13820$  $n_6 = 1.4640$ all linear dimensions being expressed in proportion to the equivalent focal length of the entire lens system considered as unity, the symbols having the meanings explained in the foregoing specification.

6. A lens as defined in claim 1, wherein the characteristics of the lens components and their spatial relationship to each other are substantially as indicated below:

| F = 1.00000 | f/6.0 | $2\omega_o = 62°$ | $s'_x = + 0.46328 F$ |
|---|---|---|---|

A I $L_1$
$R_1 = + 0.6600$
$R'_1 = + 0.5200$
$d_1 = 0.0500$  $n_1 = 1.488$
$s_{12} = 0.1050 \ (\alpha)$ B II $L_2$
$R_2 = + 1.7500$
$R'_2 = + 0.4300$
$d_2 = 0.0300$  $n_2 = 1.488$
$s_{23} = 0.4880 \ (\beta)$ C III
$L_{3a}$
$R_{3a} = + 0.560$
$R'_{3a} = + 0.285$
$d_{3a} = 0.2540$  $n_{3a} = 1.718$
$s_{3ab} = 0$ $L_{3b}$
$R_{3b} = + 0.285$
$R'_{3b} = - 1.194$
$d_{3b} = 0.0620$  $n_{3b} = 1.615$
$CS = s_{34} = 0.0460$ -continued

| F = 1.00000 | f/6.0 | $2\omega_o = 62°$ | $s'_x = + 0.46328 F$ |
|---|---|---|---|

D IV
$L_{4a}$
$R_{4a} = - 4.900$
$R'_{4a} = + 0.268$
$d_{4a} = 0.2170$  $n_{4a} = 1.561$
$s_{4ab} = 0$ $L_{4b}$
$R_{4b} = + 0.268$
$R'_{4b} = - 0.285$
$d_{4b} = 0.1460$  $n_{4b} = 1.618$
$s_{4bc} = 0$ $L_{4c}$
$R_{4c} = - 0.285$
$R'_{4c} = - 1.179$
$d_{4c} = 0.2450$  $n_{4c} = 1.720$
$s_{45} = 0.3370 \ (\gamma)$ E V $L_5$
$R_5 = - 0.3510$
$R'_5 = - 0.6334$
$d_5 = 0.33018$  $n_5 = 1.621$ all linear dimensions being expressed in proportion to the equivalent focal length of the entire lens system considered as unity, the symbols having the meanings explained in the foregoing specification.

7. A lens as defined in claim 1, wherein the characteristics of the lens components and their spatial relationship to each other are substantially as indicated below:

| F = 1.00000 | f/5.8 | $2\omega_o = 62°$ | $s'_x = + 0.34576 F$ |
|---|---|---|---|

A I $L_1$
$R_1 = + 0.72899$
$R'_1 = + 0.70971$
$d_1 = 0.105082$  $n_1 = 1.64213$
$s_{12} = 0.378494 \ (\alpha)$ B II $L_2$
$R_2 = + 2.04718$
$R'_2 = + 0.63367$
$d_2 = 0.059348$  $n_2 = 1.47104$
$s_{23} = 1.158684 \ (\beta)$ C III
$L_{3a}$
$R_{3a} = + 0.82571$
$R'_{3a} = + 0.32262$
$d_{3a} = 0.449393$  $n_{3a} = 1.71736$
$s_{3ab} = 0$ $L_{3b}$
$R_{3b} = + 0.32262$
$R'_{3b} = - 1.31867$
$d_{3b} = + 0.32262$
$d_{3b} = 0.061757$  $n_{3b} = 1.65267$
$CS = s_{34} = 0.058106$ D IV
$L_{4a}$
$R_{4a} = - 0.96265$
$R'_{4a} = + 0.32692$
$d_{4a} = 0.103890$  $n_{4a} = 1.53350$
$s_{4ab} = 0$ $L_{4b}$
$R_{4b} = + 0.32692$
$R'_{4b} = - 0.27545$
$d_{4b} = 0.254880$  $n_{4b} = 1.65152$
$s_{4bc} = 0$ $L_{4c}$
$R_{4c} = - 0.27545$
$R'_{4c} = - 0.95463$
$d_{4c} = 0.252644$  $n_{4c} = 1.72000$
$s_{45} = 0.326201 \ (\gamma)$ E V $L_5$
$R_5 = - 0.38531$
$R'_5 = - 0.90547$
$d_5 = 0.142792$  $n_5 = 1.46125$ all linear dimensions being expressed in proportion to the equivalent focal length of the entire lens system considered as unity, the symbols having the meanings explained in the foregoing specification.

8. A lens as defined in claim 1, wherein the characteristics of the lens components and their spatial relationship to each other are substantially as indicated below:

| F = 1.00000 | f/4.8 | $2\omega_o = 92°$ | $s'_x = + 0.16667 F$ |
|---|---|---|---|

A I $L_1$
$R_1 = + 1.0650$
$R'_1 = + 0.5300$
$d_1 = 0.0500$  $n_1 = 1.659$
$s_{12} = 0.3000 \ (\alpha)$ B II $L_2$
$R_2 = + 0.8050$
$R'_2 = + 0.8750$
$d_2 = 0.2850$  $n_2 = 1.785$
$s_{23} = 0.3000 \ (\beta)$ -continued

| F = 1.00000 | f/4.8 | $2\omega_0 = 92°$ | $s'_z = +0.16667\,F$ |
|---|---|---|---|
| C III | $L_{3a}$ | $R_{3a} = +1.2200$ | $d_{3a} = 0.0340$ $n_{3a} = 1.734$ |
| | | $R'_{3a} = +0.2260$ | $s_{3ab} = 0$ |
| | $L_{3b}$ | $R_{3b} = +0.2260$ | $d_{3b} = 0.1900$ $n_{3b} = 1.717$ |
| | | $R'_{3b} = -0.4050$ | $s_{3bc} = 0$ |
| | $L_{3c}$ | $R_{3c} = -0.4050$ | $d_{3c} = 0.0340$ $n_{3c} = 1.6730$ |
| | | $R'_{3c} = +1.6050$ | $CS = s_{34} = 0.0950$ |
| D IV | $L_{4a}$ | $R_{4a} = +1.1410$ | $d_{4a} = 0.0340$ $n_{4a} = 1.668$ |
| | | $R'_{4a} = +0.3650$ | $s_{4ab} = 0$ |
| | $L_{4b}$ | $R_{4b} = +0.3650$ | $d_{4b} = 0.3330$ $n_{4b} = 1.698$ |
| | | $R'_{4b} = -0.3650$ | $s_{4bc} = 0$ |
| | $L_{4c}$ | $R_{4c} = -0.3650$ | $d_{4c} = 0.0600$ $n_{4c} = 1.847$ |
| | | $R'_{4c} = -0.8270$ | $s_{45} = 0.6280\,(\gamma)$ |
| E V | $L_5$ | $R_5 = -0.4670$ | $d_5 = 0.1430$ $n_5 = 1.639$ |
| | | $R'_5 = -1.58825$ | | all linear dimensions being expressed in proportion to the equivalent focal length of the entire lens system considered as unity, the symbols having the meanings explained in the foregoing specification.

9. A lens as defined in claim 1, wherein the characteristics of the lens components and their spatial relationship to each other are substantially as indicated below:

| F = 1.00000 | f/5.6 | $2\omega_0 = 62°$ | $s'_z = +0.34332F$ |
|---|---|---|---|
| A I | $L_1$ | $R_1 = +0.60641$ | $d_1 = 0.137686$ $n_1 = 1.50049$ |
| | | $R'_1 = +0.50588$ | $s_{12} = 0.236963\,(\alpha)$ |
| B II | $L_2$ | $R_2 = +6.17438$ | $d_2 = 0.033838$ $n_2 = 1.46671$ |
| | | $R'_2 = +0.52817$ | $s_{23} = 0.475467\,(\beta)$ |
| C III | $L_{3a}$ | $R_{3a} = +0.65168$ | $d_{3a} = 0.409456$ $n_{3a} = 1.71736$ |
| | | $R'_{3a} = +0.27270$ | $s_{3ab} = 0$ |
| | $L_{3b}$ | $R_{3b} = +0.27270$ | $d_{3b} = 0.100942$ $n_{3b} = 1.65111$ |
| | | $R'_{3b} = -1.63687$ | $CS = s_{34} = 0.123972$ |
| D IV | $L_{4a}$ | $R_{4a} = -2.89238$ | $d_{4a} = 0.017465$ $n_{4a} = 1.50825$ |
| | | $R'_{4a} = +0.30925$ | $s_{4ab} = 0$ |
| | $L_{4b}$ | $R_{4b} = -0.30925$ | $d_{4b} = 0.196865$ $n_{4b} = 1.65101$ |
| | | $R'_{4b} = -0.25264$ | $s_{4bc} = 0$ |
| | $L_{4c}$ | $R_{4c} = -0.25264$ | $d_{4c} = 0.416984$ $n_{4c} = 1.72000$ |
| | | $R'_{4c} = -1.03084$ | $s_{45} = 0.246255\,(\gamma)$ |
| E V | $L_5$ | $R_5 = -0.37223$ | $d_5 = 0.111302$ $n_5 = 1.62417$ |
| | | $R'_5 = -0.74601$ | | all linear dimensions being expressed in proportion to the equivalent focal length of the entire lens system considered as unity, the symbols having the meanings explained in the foregoing specification.

10. A lens as defined in claim 1, wherein the characteristics of the lens components and their spatial relationship to each other are substantially as indicated below:

| F = 1.00000 | f/5.6 | $2\omega_0 = 63°$ | $s'_z = +0.29213\,F$ |
|---|---|---|---|
| A I | $L_1$ | $R_1 = +0.64844$ | $d_1 = 0.083260$ $n_1 = 1.62787$ |
| | | $R'_1 = +0.60824$ | $s_{12} = 0.274528\,(\alpha)$ |
| B II | $L_2$ | $R_2 = +2.62643$ | $d_2 = 0.044723$ $n_2 = 1.48677$ |
| | | $R'_2 = +0.60573$ | $s_{23} = 0.755528\,(\beta)$ |
| C III | $L_{3a}$ | $R_{3a} = +0.70706$ | $d_{3a} = 0.469547$ $n_{3a} = 1.71736$ |
| | | $R'_{3a} = +0.28086$ | $s_{3ab} = 0$ |
| | $L_{3b}$ | $R_{3b} = +0.28086$ | $d_{3b} = 0.083260$ $n_{3b} = 1.64313$ |
| | | $R'_{3b} = -1.30408$ | $CS = s_{34} = 0.064427$ |
| D IV | $L_{4a}$ | $R_{4a} = -0.93891$ | $d_{4a} = 0.015852$ $n_{4a} = 1.51006$ |
| | | $R'_{4a} = +0.29417$ | $s_{4ab} = 0$ |
| | $L_{4b}$ | $R_{4b} = +0.29417$ | $d_{4b} = 0.256514$ $n_{4b} = 1.63922$ |
| | | $R'_{4b} = -0.24176$ | $s_{4bc} = 0$ |
| | $L_{4c}$ | $R_{4c} = -0.24176$ | $d_{4c} = 0.265011$ $n_{4c} = 1.72000$ |
| | | $R'_{4c} = -0.80023$ | $s_{45} = 0.290553\,(\gamma)$ |
| E V | $L_5$ | $R_5 = -0.36782$ | $d_5 = 0.210300$ $n_5 = 1.46068$ |
| | | $R'_5 = -1.06346$ | | all linear dimensions being expressed in proportion to the equivalent focal length of the entire lens system considered as unity, the symbols having the meanings explained in the foregoing specification.

11. A lens as defined in claim 1, wherein the characteristics of the lens components and their spatial relationship to each other are substantially as indicated below:

| F = 1.00000 | f/5.6 | $2\omega_0 = 66°$ | $s'_z = +0.30206\,F$ |
|---|---|---|---|
| | | | $n_d / \nu_d$ |
| A I | $L_1$ | $R_1 = +0.75149$ | $d_1 = 0.113511$  1.64769/33.86 |
| | | $R'_1 = +0.73007$ | $s_{12} = 0.272687\,(\alpha)$ |
| B II | $L_2$ | $R_2 = +2.27575$ | $d_2 = 0.046970$  1.50847/61.19 |
| | | $R'_2 = +0.58415$ | $s_{23} = 0.774483\,(\beta)$ |
| C III | $L_{3a}$ | $R_{3a} = +0.73007$ | $d_{3a} = 0.416206$  1.71736/29.52 |
| | | $R'_{3a} = +0.28041$ | $s_{3ab} = 0$ |
| | $L_{3b}$ | $R_{3b} = +0.28041$ | $d_{3b} = 0.146129$  1.71300/53.85 |
| | | $R'_{3b} = -1.46737$ | $CS = s_{34} = 0.076979$ |
| D IV | $L_{4a}$ | $R_{4a} = -0.89963$ | $d_{4a} = 0.015657$  1.54883/45.43 |
| | | $R'_{4a} = +0.26669$ | $s_{4ab} = 0$ |
| | $L_{4b}$ | $R_{4b} = +0.26669$ | $d_{4b} = 0.182661$  1.61772/49.78 |
| | | $R'_{4b} = -0.22927$ | $s_{4bc} = 0$ |
| | $L_{4c}$ | $R_{4c} = -0.22927$ | $d_{4c} = 0.259640$  1.71300/53.85 |
| | | $R'_{4c} = -0.68928$ | $s_{45} = 0.278428\,(\gamma)$ |
| E V | $L_5$ | $R_5 = -0.35815$ | $d_5 = 0.210582$  1.46450/65.70 |
| | | $R'_5 = -0.98076$ | | all linear dimensions being expressed in proportion to the equivalent focal length of the entire lens system considered as unity, the symbols having the meanings explained in the foregoing specification.

12. A lens as defined in claim 1, wherein the characteristics of the lens components and their spatial relationship to each other are substantially as indicated below:

| F = 1.00000 | f/4.6 | $2\omega_o = 92°$ | $s'_z = + 0.19685\ F$ |
|---|---|---|---|

| | | | | |
|---|---|---|---|---|
| A | I | $L_1$ | $R_1 = + 1.66676$ | $d_1 = 0.076352$ $n_1 = 1.51264$ |
| | | | $R'_1 = + 0.58362$ | $s_{12} = 0.351418\ (\alpha)$ |
| B | II | $L_2$ | $R_2 = + 0.81023$ | $d_2 = 0.268400$ $n_2 = 1.80139$ |
| | | | $R'_2 = + 1.00036$ | $s_{23} = 0.255526\ (\beta)$ |
| | | $L_{3a}$ | $R_{3a} = + 0.085796$ | $d_{3a} = 0.025761$ $n_{3a} = 1.75055$ |
| | | | $R'_{3a} = + 0.28951$ | $s_{3ab} = 0$ |
| C | III | $L_{3b}$ | $R_{3b} = + 0.28951$ | $d_{3b} = 0.177835$ $n_{3b} = 1.67912$ |
| | | | $R'_{3b} = - 0.74739$ | $s_{3bc} = 0$ |
| | | $L_{3c}$ | $R_{3c} = - 0.74739$ | $d_{3c} = 0.029895$ $n_{3c} = 1.60558$ |
| | | | $R'_{3c} = + 1.20152$ | $CS = s_{34} = 0.125000$ |
| | | $L_{4a}$ | $R_{4a} = + 1.82911$ | $d_{4a} = 0.041247$ $n_{4a} = 1.65157$ |
| | | | $R'_{4a} = + 0.45199$ | $s_{4ab} = 0$ |
| D | IV | $L_{4b}$ | $R_{4b} = + 0.45199$ | $d_{4b} = 0.400001$ $n_{4b} = 1.75360$ |
| | | | $R'_{4b} = - 0.36980$ | $s_{4bc} = 0$ |
| | | $L_{4c}$ | $R_{4c} = - 0.36980$ | $d_{4c} = 0.089318$ $n_{4c} = 1.84666$ |
| | | | $R'_{4c} = - 0.96018$ | $s_{45} = 0.549608\ (\gamma)$ |
| E | V | $L_5$ | $R_5 = - 0.50039$ | $d_5 = 0.059935$ $n_5 = 1.58903$ |
| | | | $R'_5 = - 2.07556$ | | all linear dimensions being expressed in proportion to the equivalent focal length of the entire lens system considered as unity, the symbols having the meanings explained in the foregoing specification.

13. A lens as defined in claim 1, wherein the characteristics of the lens components and their spatial relationship to each other are substantially as indicated below:

| F = 1.00000 | f/6.0 | $2\omega_o = 62°$ | $s'_z = + 0.50401\ F$ |
|---|---|---|---|

| | | | | | $n_d/\nu_d$ |
|---|---|---|---|---|---|
| A | I | $L_1$ | $R_1 = + 0.62490$ | $d_1 = 0.046875$ | 1.48749/70.45 |
| | | | $R'_1 = + 0.49801$ | $s_{12} = 0.117122\ (\alpha)$ | |
| B | II | $L_2$ | $R_2 = + 1.74276$ | $d_2 = 0.029518$ | 1.48749/70.45 |
| | | | $R'_2 = + 0.40190$ | $s_{23} = 0.490157\ (\beta)$ | |
| | | $L_{3a}$ | $R_{3a} = + 0.55230$ | $d_{3a} = 0.219002$ | 1.71736/29.52 |
| C | III | | $R'_{3a} = + 0.28403$ | $s_{3ab} = 0$ | |
| | | $L_{3b}$ | $R_{3b} = + 0.28403$ | $d_{3b} = 0.116746$ | 1.61484/51.15 |
| | | | $R'_{3b} = - 1.08295$ | $CS = s_{34} = 0.062642$ | |
| | | $L_{4a}$ | $R_{4a} = - 5.60031$ | $d_{4a} = 0.183993$ | 1.56138/45.24 |
| | | | $R'_{4a} = + 0.24763$ | $s_{4ab} = 0$ | |
| D | IV | $L_{4b}$ | $R_{4b} = + 0.24763$ | $d_{4b} = 0.167948$ | 1.61795/52.59 |
| | | | $R'_{4b} = - 0.26158$ | $s_{4bc} = 0$ | |
| | | $L_{4c}$ | $R_{4c} = - 0.26158$ | $d_{4c} = 0.206808$ | 1.72000/50.42 |
| | | | $R'_{4c} = - 1.62926$ | $s_{45} = 0.337289\ (\gamma)$ | |
| E | V | $L_5$ | $R_5 = - 0.32745$ | $d_5 = 0.025142$ | 1.62041/60.29 |
| | | | $R'_5 = - 0.48265$ | | | all linear dimensions being expressed in proportion to the equivalent focal length of the entire lens system considered as unity, the symbols having the meanings explained in the foregoing specification.

14. A lens as defined in claim 1, wherein the characteristics of the lens components and their spatial relationship to each other are substantially as indicated below:

| F = 1.00000 | f/5.6 | $2\omega_o = 62°$ | $s'_z = + 0.46346\ F$ |
|---|---|---|---|

| | | | | | $n_d/\nu_d$ |
|---|---|---|---|---|---|
| A | I | $L_1$ | $R_1 = + 0.62385$ | $d_1 = 0.049905$ | 1.48749/70.45 |
| | | | $R'_1 = + 0.54023$ | $s_{12} = 0.108482\ (\alpha)$ | |
| B | II | $L_2$ | $R_2 = + 1.78392$ | $d_2 = 0.028470$ | 1.48749/70.45 |
| | | | $R'_2 = + 0.40190$ | $s_{23} = 0.527684\ (\beta)$ | |
| | | $L_{3a}$ | $R_{3a} = + 0.57641$ | $d_{3a} = 0.252797$ | 1.71736/29.52 |
| C | III | | $R'_{3a} = + 0.28271$ | $s_{3ab} = 0$ | |
| | | $L_{3b}$ | $R_{3b} = + 0.28271$ | $d_{3b} = 0.062995$ | 1.61484/51.15 |
| | | | $R'_{3b} = - 1.19216$ | $CS = s_{34} = 0.045814$ | |
| | | $L_{4a}$ | $R_{4a} = - 4.88464$ | $d_{4a} = 0.216964$ | 1.56138/45.24 |
| | | | $R'_{4a} = + 0.26689$ | $s_{4ab} = 0$ | |
| D | IV | $L_{4b}$ | $R_{4b} = + 0.26689$ | $d_{4b} = 0.147261$ | 1.61795/52.59 |
| | | | $R'_{4b} = - 0.29094$ | $s_{4bc} = 0$ | |
| | | $L_{4c}$ | $R_{4c} = - 0.29094$ | $d_{4c} = 0.244616$ | 1.72000/50.42 |
| | | | $R'_{4c} = - 1.19216$ | $s_{45} = 0.336572\ (\gamma)$ | |
| E | V | $L_5$ | $R_5 = - 0.35081$ | $d_5 = 0.032397$ | 1.62041/60.29 |
| | | | $R'_5 = - 0.63291$ | | | all linear dimensions being expressed in proportion to the equivalent focal length of the entire lens system considered as unity, the symbols having the meanings explained in the foregoing specification.

15. A lens as defined in claim 1, wherein the characteristics of the lens components and their spatial relationship to each other are substantially as indicated below:

| F = 1.00000 | f/5.6 | $2\omega_o = 63°$ | $s'_z = + 0.35027\ F$ |
|---|---|---|---|

| | | | | | $n_d/\nu_d$ |
|---|---|---|---|---|---|
| A | I | $L_1$ | $R_1 = + 0.76434$ | $d_1 = 0.128618$ | 1.64769/33.86 |
| | | | $R'_1 = + 0.73737$ | $s_{12} = 0.257982\ (\alpha)$ | |
| B | II | $L_2$ | $R_2 = + 2.52384$ | $d_2 = 0.044780$ | 1.51454/54.68 |
| | | | $R'_2 = + 0.59413$ | $s_{23} = 0.772950\ (\beta)$ | |
| | | $L_{3a}$ | $R_{3a} = + 0.72680$ | $d_{3a} = 0.446554$ | 1.71736/29.52 |
| C | III | | $R'_{3a} = + 0.28117$ | $s_{3ab} = 0$ | |
| | | $L_{3b}$ | $R_{3b} = + 0.28117$ | $d_{3b} = 0.114189$ | 1.71300/53.85 |
| | | | $R'_{3b} = - 1.45017$ | $CS = s_{34} = 0.075628$ | |
| | | $L_{4a}$ | $R_{4a} = - 0.83330$ | $d_{4a} = 0.039307$ | 1.54883/45.43 |
| | | | $R'_{4a} = + 0.27124$ | $s_{4ab} = 0$ | |
| D | IV | $L_{4b}$ | $R_{4b} = + 0.27124$ | $d_{4b} = 0.183846$ | 1.61772/49.78 |
| | | | $R'_{4b} = - 0.23152$ | $s_{4bc} = 0$ | |
| | | $L_{4c}$ | $R_{4c} = - 0.23152$ | $d_{4c} = 0.246538$ | 1.71300/53.85 |
| | | | $R'_{4c} = - 0.70115$ | $s_{45} = 0.297288\ (\gamma)$ | |
| E | V | $L_5$ | $R_5 = - 0.36167$ | $d_5 = 0.137325$ | 1.46450/65.70 |
| | | | $R'_5 = - 0.85768$ | | | all linear dimensions being expressed in proportion to the equivalent focal length of the entire lens system considered as unity, the symbols having the meanings explained in the foregoing specification.

16. A lens as defined in claim 1, wherein the characteristics of the lens components and their spatial relationship to each other are substantially as indicated below:

| F = 1.00000 | | f/4.7 | $2\omega_0 = 92°$ | $s'_z = +0.16614\, F$ | |
|---|---|---|---|---|---|
| | | | | | $n_d/\nu_d$ |
| A I | $L_1$ | $R_1 = +1.04603$ | | $d_1 = 0.060577$ | 1.65844/50.88 |
| | | $R'_1 = +0.54347$ | | | |
| | | | | $s_{12} = 0.328699\ (\alpha)$ | |
| B II | $L_2$ | $R_2 = +0.83689$ | | $d_2 = 0.275891$ | 1.78470/26.08 |
| | | $R'_2 = +0.87379$ | | | |
| | | | | $s_{23} = 0.295776\ (\beta)$ | |
| C III | $L_{3a}$ | $R_{3a} = -1.21655$ | | $d_{3a} = 0.022914$ | 1.73350/51.65 |
| | | $R'_{3a} = +0.22585$ | | | |
| | | | | $s_{3ab} = 0$ | |
| | $L_{3b}$ | $R_{3b} = +0.22585$ | | $d_{3b} = 0.188975$ | 1.71700/47.99 |
| | | $R'_{3b} = -0.40172$ | | | |
| | | | | $s_{3bc} = 0$ | |
| | $L_{3c}$ | $R_{3c} = -0.40172$ | | $d_{3c} = 0.033054$ | 1.67270/32.20 |
| | | $R'_{3c} = -1.58797$ | | | |
| | | | | $CS = s_{31} = 0.096397$ | |
| D IV | $L_{4a}$ | $R_{4a} = -1.14038$ | | $d_{4a} = 0.034239$ | 1.66755/41.93 |
| | | $R'_{4a} = +0.36061$ | | | |
| | | | | $s_{4ab} = 0$ | |
| | $L_{4b}$ | $R_{4b} = +0.36061$ | | $d_{4b} = 0.331332$ | 1.69761/38.56 |
| | | $R'_{4b} = -0.36844$ | | | |
| | | | | $s_{4bc} = 0$ | |
| | $L_{4c}$ | $R_{4c} = -0.36844$ | | $d_{4c} = 0.059261$ | 1.84666/23.82 |
| | | $R'_{4c} = -0.83089$ | | | |
| | | | | $s_{45} = 0.628162\ (\gamma)$ | |
| E V | $L_5$ | $R_5 = -0.46722$ | | $d_5 = 0.143806$ | 1.63854/55.38 |
| | | $R'_5 = -1.58797$ | | | | all linear dimensions being expressed in proportion to the equivalent focal length of the entire lens system considered as unity, the symbols having the meanings explained in the foregoing specification.

17. A lens as defined in claim 1, wherein the characteristics of the lens components and their spatial relationship to each other are substantially as indicated below:

| F = 1.00000 | | f/4.5 | $2\omega_0 = 92°$ | $s'_z = +0.27371\, F$ | |
|---|---|---|---|---|---|
| | | | | | $n_d/\nu_d$ |
| A I | $L_1$ | $R_1 = +0.81734$ | | $d_1 = 0.050884$ | 1.63854/55.38 |
| | | $R'_1 = +0.46958$ | | | |
| | | | | $s_{12} = 0.420381\ (\alpha)$ | |
| B II | $L_2$ | $R_2 = +0.61730$ | | $d_2 = 0.310132$ | 1.62004/36.37 |
| | | $R'_2 = +0.46627$ | | | |
| | | | | $s_{23} = 0.076848\ (\beta)$ | |
| C III | $L_{3a}$ | $R_{3a} = +0.86571$ | | $d_{3a} = 0.135560$ | 1.78831/47.37 |
| | | $R'_{3a} = -0.42462$ | | | |
| | | | | $s_{3ab} = 0$ | |
| | $L_{3b}$ | $R_{3b} = -0.42462$ | | $d_{3b} = 0.044491$ | 1.67270/32.20 |
| | | $R'_{3b} = +1.32364$ | | | |
| | | | | $CS = s_{34} = 0.060930$ | |
| D IV | $L_{4a}$ | $R_{4a} = +1.66640$ | | $d_{4a} = 0.039794$ | 1.46450/65.70 |
| | | $R'_{4a} = +0.45963$ | | | |
| | | | | $s_{4ab} = 0$ | |
| | $L_{4b}$ | $R_{4b} = +0.45963$ | | $d_{4b} = 0.553723$ | 1.66755/41.93 |
| | | $R'_{4b} = -0.37843$ | | | |
| | | | | $s_{4bc} = 0$ | |
| | $L_{4c}$ | $R_{4c} = -0.37843$ | | $d_{4c} = 0.032618$ | 1.84666/23.82 |
| | | $R'_{4c} = -0.84115$ | | | |
| | | | | $s_{45} = 0.418163\ (\gamma)$ | |
| E V | $L_5$ | $R_5 = -0.44657$ | | $d_5 = 0.050232$ | 1.51009/63.52 |
| | | $R'_5 = -1.23986$ | | | | all linear dimensions being expressed in proportion to the equivalent focal length of the entire lens system considered as unity, the symbols having the meanings explained in the foregoing specification.

18. A lens as defined in claim 1, wherein the characteristics of the lens components and their spatial relationship to each other are substantially as indicated below:

| F = 1.00000 | | f/4.5 | $2\omega_0 = 93°$ | $s'_z = +0.17408\, F$ | |
|---|---|---|---|---|---|
| | | | | | $n_d/\nu_d$ |
| A I | $L_1$ | $R_1 = +1.12715$ | | $d_1 = 0.084056$ | 1.65844/50.88 |
| | | $R'_1 = +0.56162$ | | | |
| | | | | $s_{12} = 0.374925\ (\alpha)$ | |
| B II | $L_2$ | $R_2 = +1.00544$ | | $d_2 = 0.307667$ | 1.78470/26.08 |
| | | $R'_2 = +1.17681$ | | | |
| | | | | $s_{23} = 0.278572\ (\beta)$ | |
| C III | $L_{3a}$ | $R_{3a} = +1.39179$ | | $d_{3a} = 0.023189$ | 1.73350/51.65 |
| | | $R'_{3a} = +0.23435$ | | | |
| | | | | $s_{3ab} = 0$ | |
| | $L_{3b}$ | $R_{3b} = +0.23435$ | | $d_{3b} = 0.199818$ | 1.71700/47.99 |
| | | $R'_{3b} = -0.36466$ | | | |
| | | | | $s_{3bc} = 0$ | |
| | $L_{3c}$ | $R_{3c} = -0.36466$ | | $d_{3c} = 0.034594$ | 1.68893/31.17 |
| | | $R'_{3c} = +1.69869$ | | | |
| | | | | $CS = s_{31} = 0.086615$ | |
| D IV | $L_{4a}$ | $R_{4a} = +1.01170$ | | $d_{4a} = 0.056195$ | 1.67003/47.12 |
| | | $R'_{4a} = +0.35926$ | | | |
| | | | | $s_{4ab} = 0$ | |
| | $L_{4b}$ | $R_{4b} = +0.035926$ | | $d_{4b} = 0.293940$ | 1.69761/38.56 |
| | | $R'_{4b} = -0.36913$ | | | |
| | | | | $s_{4bc} = 0$ | |
| | $L_{4c}$ | $R_{4c} = -0.36913$ | | $d_{4c} = 0.058820$ | 1.84666/23.82 |
| | | $R'_{4c} = -0.84358$ | | | |
| | | | | $s_{45} = 0.601778\ (\gamma)$ | |
| E V | $L_5$ | $R_5 = -0.44655$ | | $d_5 = 0.172141$ | 1.63854/55.38 |
| | | $R'_5 = -1.51703$ | | | | all linear dimensions being expressed in proportion to the equivalent focal length of the entire lens system considered as unity, the symbols having the meanings explained in the foregoing specification.

* * * * *